United States Patent

Takamatsu et al.

[11] Patent Number: 5,957,807
[45] Date of Patent: Sep. 28, 1999

[54] TRANSMISSION CONTROLLER RESPONSIVE TO LOW OIL TEMPERATURE TO DELAY THE RELEASING CLUTCH

[75] Inventors: Masaaki Takamatsu; Osahide Miyamoto; Masahide Saito; Toshiyuki Suzuki; Tadahiro Suzuki, all of Tochigi-ken, Japan

[73] Assignee: Honda Giken Kogyo Kabushiki Kaisha, Tokyo, Japan

[21] Appl. No.: 09/128,935

[22] Filed: Aug. 5, 1998

[30] Foreign Application Priority Data

Aug. 28, 1997 [JP] Japan ................................. 9-233053

[51] Int. Cl.$^6$ .................................................. F16H 61/00
[52] U.S. Cl. .............................................. 477/98; 477/156
[58] Field of Search .......................... 477/97, 98, 154, 477/156, 158

[56] References Cited

U.S. PATENT DOCUMENTS

| | | | |
|---|---|---|---|
| 5,467,854 | 11/1995 | Creger et al. | 477/155 |
| 5,743,826 | 4/1998 | Usuki et al. | 477/98 |
| 5,803,863 | 9/1998 | Hayward et al. | 477/98 |
| 5,857,162 | 1/1999 | Vukovich et al. | 477/98 X |

FOREIGN PATENT DOCUMENTS

| | | | |
|---|---|---|---|
| 3-79856 | 4/1991 | Japan | 477/98 |
| 3-213766 | 9/1991 | Japan | 477/98 |
| 3-223562 | 10/1991 | Japan | 477/98 |

*Primary Examiner*—Khoi Q. Ta
*Attorney, Agent, or Firm*—Armstrong, Westerman, Hattori, McLeland & Naughton

[57] ABSTRACT

In a control apparatus for a hydraulically operated vehicular transmission, the hydraulic pressure of a hydraulic clutch on the engaging side which is engaged at the time of speed changing (engaging pressure) is detected by a hydraulic pressure sensor. When the detected value of the engaging pressure has exceeded a predetermined value, the hydraulic pressure of a hydraulic clutch on the disengaging side to be disengaged at the time of speed changing (disengaging pressure) is reduced to a predetermined low pressure. Even if the detected value of the engaging pressure has exceeded a predetermined value YPC, the decrease in the disengaging pressure down to a predetermined low pressure QUPOFFB is delayed by a predetermined time YTMUP9 at the time of low oil temperature when the detected value of an oil temperature to be detected by an oil temperature sensor is below a predetermined value YTO. When a discrimination is made as to whether the detected value of the engaging pressure PC(N+1) has exceeded the predetermined value YPC from a predetermined time after the start of the speed changing, the time to start the discrimination may be delayed by a predetermined time at the time of low oil temperature.

3 Claims, 11 Drawing Sheets

FIG. 5A

| MAT | | CONTROL MODE |
|---|---|---|
| Hi | Lo | |
| A | 0 | 1ST SOLENOID PROPORTIONAL VALVE $17_1$ HIGH<br>2ND SOLENOID PROPORTIONAL VALVE $17_2$ LOW |
| 0 | B | 1ST SOLENOID PROPORTIONAL VALVE $17_1$ LOW<br>2ND SOLENOID PROPORTIONAL VALVE $17_2$ HIGH |
| A | B | UNDER SHIFT CHANGING |

FIG. 5B

| MUP | | CONTROL MODE |
|---|---|---|
| ON | OFF | |
| 0 | 0 | OTHER THAN UPSHIFTING |
| 1 | — | RESPONSE PRESSURE MODE |
| 2 | — | ADDITION MODE (FORMER) |
| 3 | — | ADDITION MODE (LATTER) |
| 4 | — | BOTTOM UP MODE (FORMER) |
| 5 | — | BOTTOM UP MODE (LATTER) |
| 7 | — | END MODE |
| — | 1 | INITIAL PRESSURE MODE |
| — | 2 | SUBTRACTION MODE (FORMER) |
| — | 3 | SUBTRACTION MODE (LATTER) |
| — | 4 | BOTTOM DOWN MODE |
| — | 5 | TAIL MODE |
| — | 7 | END MODE |

TRANSMISSION CONTROLLER RESPONSIVE TO LOW OIL TEMPERATURE TO DELAY THE RELEASING CLUTCH

BACKGROUND OF THE INVENTION

1. Field of the Invention

The present invention relates to a control apparatus for a hydraulically operated vehicular transmission having a plurality of transmission trains to be established by a selecting operation of a plurality of hydraulic engaging elements. In this specification, the term "vehicular transmission" means a transmission for a vehicle such as a motor vehicle.

2. Description of the Related Art

As this kind of control apparatus, there has hitherto been known the following one. Namely, the hydraulic pressure of a hydraulic engaging element on disengaging side to be disengaged at the time of speed changing (disengaging pressure) and the hydraulic pressure of a hydraulic engaging element on engaging side to be engaged at the time of speed changing (engaging pressure) are electronically controlled by using solenoid proportional valves.

At the time of speed changing, especially at the time of upshifting, if the disengaging pressure is lowered before the engaging pressure has increased whereby the hydraulic engaging element on the engaging side has obtained a certain degree of engaging force, engine racing will occur to thereby cause speed change shocks.

As a solution, there is known a control apparatus in which a hydraulic pressure detecting means for detecting the engaging pressure is provided so that, when a detected value of the engaging pressure has exceeded a predetermined value to be set to such a value as will not cause engine racing, the disengaging pressure is reduced to a predetermined low pressure.

The above-described hydraulic pressure detecting means cannot be mounted on the hydraulic engaging element itself which is a rotational member. Therefore, it must be mounted on that upstream part of an oil passage which is connected to the hydraulic engaging element. As a result, between the detected value of the engaging pressure detected by the hydraulic pressure detecting means and the actual hydraulic pressure of the hydraulic engaging element on the engaging side, there will occur a difference corresponding to a pressure drop due to a flow resistance between the position at which the hydraulic pressure detecting means is mounted and the hydraulic engaging element. If the oil temperature is low, the viscosity of the oil increases and the pressure drop also increases. Therefore, at the time of low oil temperature, even if the detected value of the engaging pressure as detected by the hydraulic pressure detecting means has exceeded a predetermined value, the actual hydraulic pressure in the hydraulic engaging element on the engaging side has not sufficiently been increased. As a result, if the disengaging pressure is lowered at this point of time, the engine will race and speed change shocks will occur.

In view of the above point, the present invention has an object of providing a control apparatus in which the occurrence of speed change shocks at the time of low oil temperature can be prevented.

SUMMARY OF THE INVENTION

In order to attain the above object, according to the present invention, there is provided a control apparatus for a hydraulically operated vehicular transmission having a plurality of speed stages to be established by a selective operation of a plurality of hydraulic engaging elements, wherein a hydraulic pressure of that hydraulic engaging element on engaging side to be engaged at the time of speed changing is defined to be an engaging pressure and a hydraulic pressure of a hydraulic engaging element on disengaging side to be disengaged at the time of speed changing is defined to be a disengaging pressure, said apparatus comprising: hydraulic pressure detecting means for detecting said engaging pressure; discriminating means for discriminating whether a detected value of said engaging pressure has exceeded a predetermined value or not; and pressure reducing means for reducing said disengaging pressure to a predetermined low pressure when said detected value is discriminated to have exceeded said predetermined value; characterized in that said apparatus further comprises: oil temperature detecting means for detecting an oil temperature in said transmission; and delay means for delaying the operation of said pressure reducing means at a time of low oil temperature when a detected value of said oil temperature is below said predetermined value.

In this case, preferably the delay means is constituted such that, at the time of low oil temperature, the delay means is operated by delaying by a predetermined time from the point of time when the engaging pressure has exceeded the predetermined value. The discriminating means is constituted to start the discrimination from a predetermined discrimination starting time after starting of speed changing, and the delay means is constituted to delay the discrimination starting time by a predetermined time at the time of the low oil temperature.

Anyway, since the operation of the pressure reducing means is delayed at the time of low oil temperature as compared at the time of high oil temperature, the actual hydraulic pressure in the hydraulic engaging element on the engaging side has sufficiently been increased at the time when the disengaging pressure is reduced to the predetermined low pressure by the operation of the pressure reducing means. Therefore, a smooth speed changing without engine racing can be performed.

In the embodiment to be described hereinafter, what corresponds to the above-described discriminating means are the steps S8-13 in FIG. 9 and S8-26 in FIG. 11. What corresponds to the above-described pressure reducing means are steps S8-17 and S8-18 in FIGS. 9 and 11. What corresponds to the above-described delay means are steps S8-16 in FIG. 9 and S8-25 in FIG. 11. The oil temperature detecting means in the embodiment to be described hereinbelow is constituted by an oil temperature sensor which directly detects the oil temperature in the transmission. However, it may also be constituted by one which indirectly detects the oil temperature based on the cooling water temperature in the engine or based on the lapse of time from the starting of the engine.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 5A and 5B are diagrams to show the relationship among various monitor values to be used in speed change control and control mode;

DETAILED DESCRIPTION OF PREFERRED EMBODIMENTS

Figure 1:
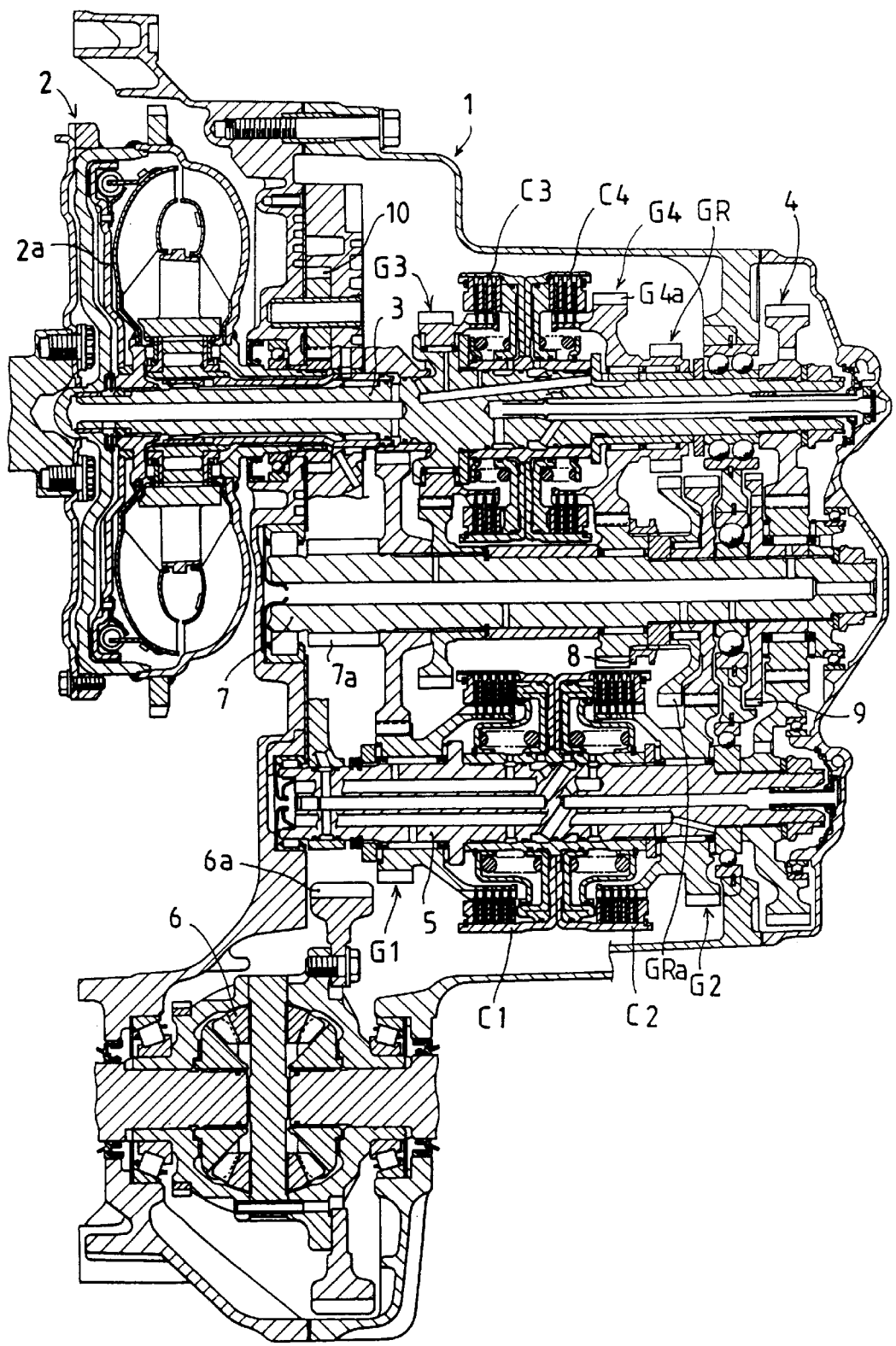
FIG. 1 is a cross-sectional view of a transmission to which the apparatus of the present invention is applied.

With reference to FIG. 1, numeral 1 denotes a hydraulically operated vehicular transmission for carrying out speed changing of four forward transmission trains and one reverse transmission train. The transmission 1 is provided with an input shaft 3 which is connected to an engine via a fluid torque converter 2; an intermediate shaft 5 which is always connected to the input shaft 3 via a gear train 4; and an output shaft 7 having a shaft end output gear 7a which is engaged with a final gear 6a on a differential 6 which is connected to driving wheels of a vehicle such as a motor vehicle. In the figure, the final gear 6a and the output gear 7a are illustrated in a manner separated from each other. This is because the figure is drawn in a development view, and both the gears 6a, 7a are actually in mesh with each other.

A first speed transmission train G1 and a second speed transmission train G2 are provided in parallel between the intermediate shaft 5 and the output shaft 7. A third speed transmission train G3, and a fourth speed transmission train G4 and a reverse transmission train GR are provided in parallel between the input shaft 3 and the output shaft 7. On the intermediate shaft 5 there are provided a first speed hydraulic clutch C1 and a second speed clutch C2, which are both defined as hydraulic engaging elements, interposed in the fist speed and the second speed transmission trains G1, G2, respectively. On the input shaft 5 there are provided a third speed hydraulic clutch C3 and a fourth speed hydraulic clutch C4, both of which are defined as hydraulic engaging elements, interposed in the third speed and the fourth speed transmission trains G3, G4, respectively. It is thus so arranged that, when each of the hydraulic clutches C1, C2, C3, C4 is engaged, the corresponding transmission train G1, G2, G3, G4 can be selectively established. The reverse transmission train GR is constituted or arranged to commonly use the fourth speed hydraulic clutch C4 with the fourth transmission train G4. By a switching (or changeover) operation of a selector gear 8 on the input shaft 7 between a forward running (or a forward drive) side on the left side as seen in FIG. 1 and a reverse running (or a reverse drive) side on the right side therein, the selector gear 8 is engaged with a driven gear G4a, GRa of the fourth speed transmission train G4 and the reverse transmission train GR, respectively. The fourth speed transmission train G4 and the reverse transmission train GR are thus selectively established. In the reverse transmission train GR, an idle gear (not illustrated) is interposed. Reference numeral 9 in the figure denotes a parking gear provided on the output shaft 7.

Figure 2:
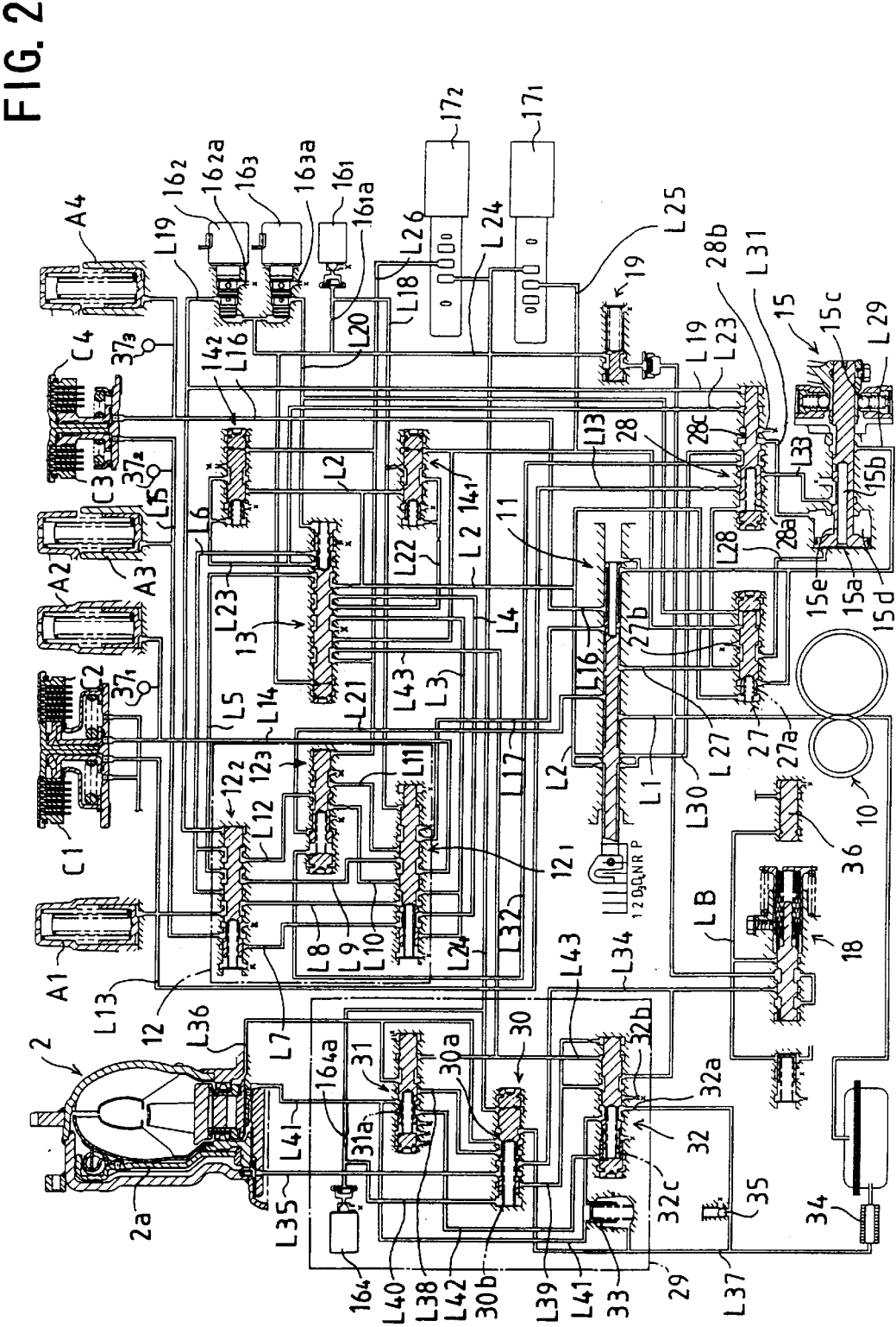
FIG. 2 is a diagram showing a hydraulic oil circuit of the transmission in FIG. 1.

Supply and discharge of hydraulic oil to and from each of the above-described hydraulic clutches C1–C4 are controlled by a hydraulic circuit as shown in FIG. 2. The hydraulic circuit is provided with: a hydraulic pressure source 10 which is made up of a gear pump driven by the engine via a casing of the fluid torque converter 2; a manual valve 11 which is operated for switching in interlocking with a selector lever inside a vehicle compartment; a shift valve unit 12; a changeover valve 13 on an upstream side of the shift valve unit 12; a pair of first and second pressure regulating valves $14_1$, $14_2$ which are connected to the changeover valve 13; a servo valve 15 which switches between the forward running and the reverse running and to which is connected a fork 8a to be engaged with the selector gear 8; three sets of first through third solenoid valves $16_1$, $16_2$, $16_3$ for controlling to switch the shift valve unit 12 and the changeover valve 13; and a pair of first and second solenoid proportional valves $17_1$, $17_2$ for controlling to regulate the hydraulic pressure in the first and the second pressure regulating valves $14_1$, $14_2$. Reference numerals A1 through A4 denote accumulators provided to absorb sudden pressure changes in each of the hydraulic clutches C1 through C4, respectively.

The manual valve 11 is switchable to a total of seven positions (or ranges), i.e., a parking position "P", a reverse position "R", a neutral position "N", an automatic speed changing position "$D_4$" for the first through the fourth speeds, an automatic speed changing position "$D_3$" for the first through the third speeds, a second speed retaining position "2", and a first speed retaining position "1".

Figure 3:
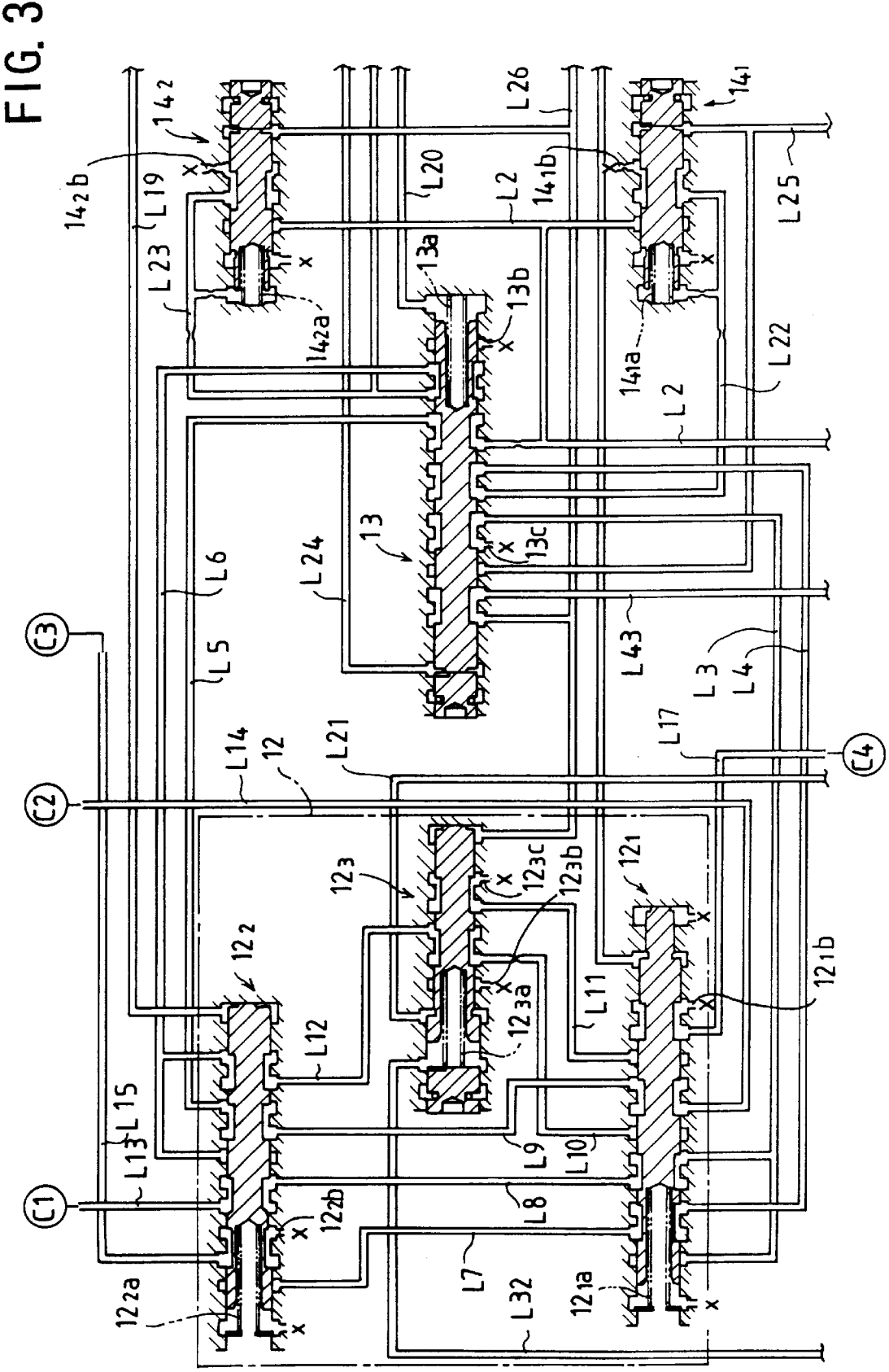
FIG. 3 is an enlarged diagram of an important portion of the hydraulic oil circuit.

In the "$D_4$" position of the manual valve 11, No. 1 oil passage L1 which is in communication with the hydraulic pressure source 10 is connected to No. 2 oil passage L2 which is in communication with the changeover valve 13. Pressurized hydraulic oil that has been regulated by a regulator 18 to a certain line pressure is supplied from No. 1 oil passage L1 to No. 2 oil passage L2. This pressurized oil is selectively supplied to the first speed through the fourth speed hydraulic clutches C1 through C4 via the changeover valve 13 and the shift valve unit 12 to thereby carry out the speed changing of the first speed through the fourth speed. Detailed explanations will be made hereinafter about the shift valve unit 12, the changeover valve 13, and the pressure regulating valves $14_1$, $14_2$ with reference to FIG. 3.

The shift valve unit 12 is constituted by three sets of first through third shift valves $12_1$, $12_2$, $12_3$. The first shift valve $12_1$ is connected to the changeover valve 13 via two, i.e., No. 3 and No. 4, oil passages L3, L4. The second shift valve $12_2$ is connected to the changeover valve 13 via two, i.e., No. 5 and No. 6, oil passages L5, L6. The first and the second shift valves $12_1$, $12_2$ are connected to each other via three, i.e., No. 7 through No. 9, oil passages L7, L8, L9. Further, the third shift valve $12_3$ is connected to the first shift valve $12_1$ via two, i.e., No. 10 and No. 11, oil passages L10, L11 and is also connected to the second shift valve $12_2$ via No. 12 oil passage L12.

The first speed hydraulic clutch C1 is connected to the second shift valve $12_2$ via No. 13 oil passage L13. The second speed hydraulic clutch C2 is connected to the first shift valve $12_1$ via No. 14 oil passage L14. The third speed hydraulic clutch C3 is connected to the second shift valve $12_2$ via No. 15 oil passage L15. The fourth speed hydraulic clutch C4 is connected to the first shift valve $12_1$ via No. 17 oil passage L17 which is connected, in the "$D_4$", "$D_3$", "2" and "1" positions of the manual valve 11, to No. 16 oil passage L16 that is connected to the fourth speed hydraulic clutch C4.

The first shift valve $12_1$ is urged to the right position by a spring $12_1a$ and is also urged to the left position by the hydraulic pressure in No. 18 oil passage L18 which is controlled by the first solenoid valve $16_1$. The second shift valve $12_2$ is urged to the right position by a spring $12_2a$ and is also urged to the left position by the hydraulic pressure in No. 19 oil passage L19 which is controlled by the second solenoid valve $16_2$. The third shift valve $12_3$ is urged to the right by a spring $12_3a$ and is also urged to the left by the hydraulic pressure in No. 21 oil passage L21 which is connected to No. 1 oil passage L1 in a position of the manual valve 11 other than the "2" and "1" positions. In the "$D_4$" position of the manual valve 11, the third shift valve $12_3$ is held or retained in the left position by the line pressure to be inputted via No. 21 oil passage L21 so that No. 10 oil passage L10 is connected to an oil discharge port $12_3b$ of the third shift valve $12_3$, and No. 11 oil passage L11 and No. 12 oil passage L12 are connected together.

At the time of the first speed running (or the first speed drive) in the "$D_4$" position of the manual valve 11, the first shift valve $12_1$ is switched to the left position and the second shift valve $12_2$ is switched to the right position. According to these operations, No. 13 oil passage L13 for the first speed hydraulic clutch C1 is connected to No. 4 oil passage L4 which is defined as a second connecting oil passage to the changeover valve 13. At this time, No. 14 oil passage L14 for the second speed hydraulic clutch C2 is connected to that oil discharge port $12_3b$ of the third shift valve $12_3$ which is defined as an oil discharge passage, via the first shift valve $12_1$ and No. 10 oil passage L10. No. 15 oil passage L15 for the third speed hydraulic clutch C3 is connected to that oil discharge port $12_2b$ of the second shift valve $12_2$ which is defined as an oil discharge passage. No. 16 oil passage L16 for the fourth speed hydraulic clutch C4 is connected to No. 6 oil passage L6, which is defined as a fourth connecting oil passage to the changeover valve 13, via No. 17 oil passage L17, the first shift valve $12_1$, No. 11 oil passage L11, the third shift valve $12_3$, No. 12 oil passage L12, and the second shift valve $12_2$.

At the time of the second speed running, the first shift valve $12_1$ is switched to the right position while holding the second shift valve $12_2$ in the right position. According to these operations, No. 14 oil passage L14 for the second speed hydraulic clutch C2 is connected to No. 5 oil passage L5, which is defined as a third connecting oil passage to the changeover valve 13, via the first shift valve $12_1$, No. 9 oil passage L9, and the second shift valve $12_2$. No. 13 oil passage L13 for the first speed hydraulic clutch C1 is connected to No. 3 oil passage L3, which is defined as a first connecting oil passage to the changeover valve 13, via the second shift valve $12_2$, No. 8 oil passage L8, and the first shift valve $12_1$. At this time, No. 15 oil passage L15 for the third speed hydraulic clutch C3 is connected to the oil discharge port $12_2b$ of the second shift valve $12_2$ like at the time of the first speed running. No. 16 oil passage L16 for the fourth speed hydraulic clutch C4 is connected to that oil discharge port $12_1b$ of the first shift valve $12_1$ which is defined as a discharge oil passage, via No. 17 oil passage L17.

At the time of the third speed running, the second shift valve $12_2$ is switched to the left position while holding the first shift valve $12_1$ in the right position. According to these operations, No. 15 oil passage L15 for the third speed hydraulic clutch C3 is connected to No. 4 oil passage L4 via the second shift valve $12_2$, No. 7 oil passage L7 and the first shift valve $12_1$. No. 14 oil passage L14 for the second speed hydraulic clutch C2 is connected to No. 6 oil passage L6 via the first shift valve $12_1$, No. 9 oil passage L9 and the second shift valve $12_2$. At this time, No. 13 oil passage L13 for the first speed hydraulic clutch C1 is connected to the oil discharge port $12_2b$ of the second shift valve $12_2$. No. 16 oil passage L16 for the fourth hydraulic clutch C4 is connected to the oil discharge port $12_1b$ of the first shift valve $12_1$ via No. 17 oil passage L17, like at the time of the second speed running.

At the time of the fourth speed running, the first shift valve $12_1$ is switched to the left position while holding the second shift valve $12_2$ in the left position. According to these operations, No. 16 oil passage L16 for the fourth speed hydraulic clutch C4 is connected to No. 5 oil passage L5 via No. 17 oil passage L17, the first shift valve $12_1$, No. 11 oil passage L11, the third shift valve $12_3$, No. 12 oil passage L12 and the second shift valve $12_2$. No. 15 oil passage L15 for the third speed hydraulic clutch C3 is connected to No. 3 oil passage L3 via the second shift valve $12_2$, No. 7 oil passage L7 and the first shift valve $12_1$. At this time, No. 13 oil passage L13 for the first speed hydraulic clutch C1 is connected to the oil discharge port $12_2b$ of the second shift valve $12_2$, like at the time of the third speed running. No. 14 oil passage L14 for the second speed hydraulic clutch C2 is connected to the oil discharge port $12_3b$ of the third shift valve $12_3$ via the first shift valve $12_1$ and No. 10 oil passage L10, like at the time of the first speed running.

To the changeover valve 13 there are connected: No. 2 oil passage L2 which is defined as an oil passage at a line pressure; No. 3 through No. 6 oil passages L3, L4, L5, L6 as the first through the fourth connecting oil passages; No. 22 oil passage L22 which is defined as a first pressure-regulated oil passage whose pressure is regulated by the first pressure regulating valve $14_1$; and No. 23 oil passage L23 which is defined as a second pressure-regulated oil passage whose pressure is regulated by the second pressure regulating valve $14_2$. The changeover valve 13 is urged to the right position, which is defined as a first switchover position, by a predetermined pressure lower than the line pressure (hereinafter called a modulator pressure) which is outputted to No. 24 oil passage L24 on the downstream side of a modulator valve 19 which is connected to No. 1 oil passage L1. The changeover valve 13 is urged to the left position, which is defined as a second switchover position, by a spring 13 a and the hydraulic pressure in No. 20 oil passage L20 to be controlled by the third solenoid valve $16_3$.

When the changeover valve 13 is in the right position, No. 3 oil passage L3 is connected to No. 22 oil passage L22, and No. 5 oil passage L5 is connected to No. 23 oil passage L23. Therefore, it becomes possible to regulate the hydraulic pressure in each of No. 3 and No. 5 oil passages L3, L5 by the first and the second pressure regulating valves $14_1$, $14_2$, respectively. At this time, No. 4 oil passage L4 is connected to No. 2 oil passage L2, and No. 6 oil passage L6 is connected to that oil discharge port 13b of the changeover valve 13 which is defined as an oil discharge passage.

When the changeover valve 13 is in the left position, No. 4 oil passage L4 is connected to No. 22 oil passage L22, and No. 6 oil passage L6 is connected to No. 23 oil passage L23. Therefore, it becomes possible to regulate the hydraulic pressure in each of No. 4 and No. 6 oil passages L4, L6 by the first and the second pressure regulating valves $14_1$, $14_2$, respectively. At this time, No. 3 oil passage L3 is connected to that oil discharge port 13c of the changeover valve 13 which is defined as the oil discharge passage, and No. 5 oil passage L5 is connected to No. 2 oil passage L2.

At the time of the first speed in which the first shift valve $12_1$ is in the left position, the second shift valve $12_2$ is in the right position, and the first speed hydraulic clutch C1 is connected to No. 4 oil passage L4, the changeover valve 13 is switched and held in the right position, and No. 4 oil passage L4 is connected to No. 2 oil passage L2. In this way, the hydraulic pressure in the first speed hydraulic clutch C1 (hereinafter called a first speed pressure) becomes the line pressure, whereby the first speed transmission train G1 is established through the engagement of the first speed hydraulic clutch C1.

At the time of the second speed in which both the first and the second shift valves $12_1$, $12_2$ are in the right position, and the first speed hydraulic clutch C1 is connected to No. 3 oil passage L3, and the second speed hydraulic clutch C2 is connected to No. 5 oil passage L5, respectively, the changeover valve 13 is switched and held in the left position, No. 3 oil passage L3 is connected to the oil discharge port 13c, and No. 5 oil passage L5 is connected to No. 2 oil passage L2. In this manner, the first speed pressure is lowered to the atmospheric pressure to thereby release the engagement of the first speed hydraulic clutch C1. On the other hand, the hydraulic pressure in the second speed hydraulic clutch C2 (hereinafter called a second speed pressure) becomes the line pressure, whereby the second speed transmission train G2 is established through the engagement of the second speed hydraulic clutch C2.

At the time of upshifting from the first speed to the second speed, both the first and the second shift valves $12_1$, $12_2$ are first switched to the condition of the second speed while holding the changeover valve 13 in the position at the time of the first speed, i.e., in the right position. In this case, No. 3 and No. 5 oil passages L3, L5 to be connected to the first and the second speed hydraulic clutches C1, C2, respectively, are connected to No. 22 and No. 23 oil passages L22, L23, respectively. Therefore, it becomes possible to control the pressure drop characteristics of the first speed pressure by the first pressure regulating valve $14_1$ and to control the pressure rise characteristics of the second speed pressure by the second pressure regulating valve $14_2$, whereby a smooth upshifting from the first speed to the second speed can be carried out. After the speed changing has been completed, the changeover valve 13 is switched to the left position. Hydraulic oil is discharged from the first speed hydraulic clutch C1 without passing through the first pressure regulating valve $14_1$, and the second speed hydraulic clutch C2 is supplied with pressurized oil at the line pressure without passing through the second pressure regulating valve $14_2$.

At the time of downshifting from the second speed to the first speed, the changeover valve 13 is first switched from the position at the time of the second speed to the position at the time of the first speed, i.e., from the left position to the right position, while holding both the shift valves $12_1$, $12_2$ to the condition at the time of the second speed. According to these operations, like at the time of upshifting from the first speed to the second speed, both the first speed and the second speed hydraulic clutches C1, C2 are connected to No. 22 and No. 23 oil passages L22, L23, respectively. Therefore, it becomes possible to control the pressure rise characteristics of the first speed pressure by the first pressure regulating valve $14_1$, and to control the pressure drop characteristics of the second speed pressure by the second pressure regulating valve $14_2$, whereby a smooth downshifting from the second speed to the first speed can be carried out. After the speed changing has been completed, both the first and the second shift valves $12_1$, $12_2$ are switched to the condition of the first speed running. The second speed hydraulic clutch C2 is connected to the oil discharge port $12_3b$ of the third shift valve $12_3$. The hydraulic oil is thus discharged from the second speed hydraulic clutch C2 without passing through the second pressure regulating valve $14_2$. And the first speed hydraulic clutch C1 is supplied with the pressurized oil at the line pressure without passing through the first pressure regulating valve $14_1$ like at the time of the first speed.

At the time of the third speed in which the first shift valve $12_1$ is in the right position, the second shift valve $12_2$ is in the left position, the second speed hydraulic clutch C2 is connected to No. 6 oil passage L6, and the third speed hydraulic clutch C3 is connected to No. 4 oil passage L4, respectively, the changeover valve 13 is switched and held in the right position. Like at the time of the first speed running, No. 6 oil passage L6 is connected to the oil discharge port 13b and No. 4 oil passage L4 is connected to No. 2 oil passage L2. In this manner, the second speed pressure is lowered to the atmospheric pressure and the engagement of the second speed hydraulic clutch C2 is thereby released. On the other hand, the hydraulic pressure in the third speed hydraulic clutch C3 (hereinafter called a third speed pressure) becomes the line pressure, whereby the third speed transmission train G3 is established through the engagement of the third speed hydraulic clutch C3.

At the time of upshifting from the second speed to the third speed, both the first and the second shift valves $12_1$, $12_2$ are switched to the condition of the third speed while holding the changeover valve 13 in the position of the second speed running, i.e., in the left position. In this case, No. 4 and No. 6 oil passages L4, L6 to be connected to the third and the second speed hydraulic clutches C3, C2 are connected to No. 22 and No. 23 oil passages L22, L23, respectively. Therefore, it becomes possible to control the pressure rise characteristics of the third speed pressure by the first pressure regulating valve $14_1$ and to control the pressure drop characteristics of the second speed pressure by the second pressure regulating valve $14_2$. Therefore, a smooth upshifting from the second speed to the third speed can be carried out. After the speed changing has been completed, the changeover valve 13 is switched to the right position. The hydraulic oil is discharged from the second speed hydraulic clutch C2 without passing through the second pressure regulating valve $14_2$, and the third speed hydraulic clutch C3 is supplied with the pressurized oil at the line pressure without passing through the first pressure regulating valve $14_1$.

At the time of downshifting from the third speed to the second speed, the changeover valve 13 is first switched from the position at the time of the third speed to the position at the time of second speed, i.e., from the right position to the left position, while holding both the first and the second shift valves $12_1$, $12_2$ to the condition of the third speed. According to these operations, like at the time of upshifting from the second speed to the third speed, both the third speed and the second speed hydraulic clutches C3, C2 are connected to No. 22 and No. 23 oil passages L22, L23, respectively. Therefore, it becomes possible to control the pressure drop characteristics of the third speed pressure by the first pressure regulating valve $14_1$, and to control the pressure rise characteristics of the second speed pressure by the second pressure regulating valve $14_2$, whereby a smooth downshifting from the third speed to the second speed can be carried out. After the speed changing has been completed, both the fist and the second shift valves $12_1$, $12_2$ are switched to the condition of the second speed and the third speed hydraulic clutch C3 is connected to the oil discharge port $12_2b$ of the second shift valve $12_2$. The hydraulic oil is thus discharged from the third speed hydraulic clutch C3 without passing through the first pressure regulating valve $14_1$ and the second speed hydraulic clutch C2 is supplied with the pressurized oil at the line pressure without passing through the second pressure regulating valve $14_2$ like at the time of the second speed.

At the time of the fourth speed in which both the first and the second shift valves $12_1$, $12_2$ are in the left position, and the third speed hydraulic clutch C3 is connected to No. 3 oil passage L3, and the fourth speed hydraulic clutch C4 is connected to No. 5 oil passage L5, respectively, the changeover valve 13 is switched and held at the left position. Like at the time of second speed, No. 3 oil passage L3 is connected to the oil discharge port 13c, and No. 5 oil passage L5 is connected to No. 2 oil passage L2. In this manner, the third speed pressure is lowered to the atmospheric pressure to thereby release the engagement of the third speed hydraulic clutch C3. On the other hand, the hydraulic pressure in the fourth speed hydraulic clutch C4 (hereinafter called a fourth speed pressure) becomes the line pressure, whereby the fourth speed transmission train G4 is established through the engagement of the fourth speed hydraulic clutch C4.

At the time of upshifting from the third speed to the fourth speed, both the first and the second shift valves $12_1$, $12_2$ are switched to the condition of the fourth speed while holding the changeover valve 13 in the position of the third speed, i.e., in the right position. In this case, No. 3 and No. 5 oil passages L3, L5 to be connected to the third and the fourth hydraulic clutches C3, C4 are connected to No. 22 and No. 23 oil passages L22, L23, respectively. Therefore, it becomes possible to control the pressure drop characteristics of the third speed pressure by the first pressure regulating valve $14_1$ and to control the pressure rise characteristics of the fourth speed pressure by the second regulating valve $14_2$. A smooth upshifting from the third speed to the fourth speed can thus be carried out. After the speed changing has been completed, the changeover valve 13 is switched to the left position. The hydraulic oil is discharged from the third speed hydraulic clutch C3 without passing through the first pressure regulating valve $14_1$. And the fourth speed hydraulic clutch C4 is supplied with the oil at the line pressure without passing through the second pressure regulating valve $14_2$.

At the time of downshifting from the fourth speed to the third speed, the changeover valve 13 is first switched from the position at the time of the fourth speed to the position at the time of the third speed, i.e., from the left position to the right position, while holding both the first and the second shift valves $12_1$, $12_2$ to the condition of the fourth speed. According to these operations, like at the time of upshifting from the third speed to the fourth speed, the third speed and the fourth speed hydraulic clutches C3, C4 are connected to No. 22 and No. 23 oil passages L22, L23, respectively. Therefore, it becomes possible to control the pressure rise characteristics of the third speed pressure by the first pressure regulating valve $14_1$, and to control the pressure drop characteristics of the fourth speed pressure by the second pressure regulating valve $14_2$, whereby a smooth downshifting from the fourth speed to the third speed can be carried out. After the speed changing has been completed, both the fist and the second shift valves $12_1$, $12_2$ are switched to the condition of the third speed. The fourth speed hydraulic clutch C4 is connected to the oil discharge port $12_1b$ of the first shift valve $12_1$. The hydraulic oil is thus discharged from the fourth speed hydraulic clutch C4 without passing through the second pressure regulating valve $14_2$. And the third speed hydraulic clutch C3 is supplied with the pressurized oil at the line pressure without passing through the first pressure regulating valve $14_1$.

Each of the first and the second pressure regulating valves $14_1$, $14_2$ is urged by each of springs $14_1a$, $14_2a$ and by the hydraulic pressure in each of No. 22 and No. 23 oil passages L22, L23 to the rightward oil discharge side in which each of No. 22 and No. 23 oil passages L22, L23 is connected to each of the oil discharge ports $14_1b$, $14_2b$, respectively. Further, the first and the second pressure regulating valves $14_1$, $14_2$ are urged by the respective hydraulic pressures in No. 25 and No. 26 oil passages L25, L26 on the output side of each of solenoid proportional valves $17_1$, $17_2$ to the leftward oil supply side in which No. 22 and No. 23 oil passages L22, L23 are respectively connected to No. 2 oil passages L2. In this manner, the hydraulic pressure in each of No. 22 and No. 23 oil passages L22, L23 is increased or decreased in proportion to the output pressure of each of the solenoid proportional valves $17_1$, $17_2$. In order to decrease the speed change shocks, it becomes necessary to perform a delicate control of the hydraulic pressure in a transient region of engagement of the hydraulic clutch on the disengaging side and the hydraulic clutch on the engaging side. In this embodiment, after the completion of the speed changing, the hydraulic oil supply to the hydraulic clutch on the engaging side and the hydraulic oil discharge from the hydraulic clutch on the disengaging side are made without passing through the pressure regulating valves $14_1$, $14_2$. Therefore, the pressure regulating valves $14_1$, $14_2$ need to bear the hydraulic pressure control only in the transient region of engagement at a relatively low hydraulic pressure. Therefore, the resolution of the pressure control can be made higher and the delicate control of the pressure rise characteristics of the hydraulic clutch on the engaging side and the pressure drop characteristics of the hydraulic clutch on the disengaging side can be performed at a higher accuracy.

Modulator pressure is inputted into both the first and the second solenoid proportional valves $17_1$, $17_2$ via No. 24 oil passage L24. Here, as the first solenoid proportional valve $17_1$, there is used one in which an output pressure becomes maximum (modulator pressure) at the time of non-energization. As the second solenoid proportional valve $17_2$, there is used one in which the output pressure becomes minimum (atmospheric pressure) at the time of non-energization.

The first solenoid valve $16_1$ is constituted by a two-way valve which opens to atmosphere No. 18 oil passage L18 which is connected to No. 24 oil passage L24 via a throttle $16_1a$. At the time of non-energization thereof, it is closed to thereby change the hydraulic pressure in No. 18 oil passage L18 to a high hydraulic pressure (modulator pressure).

Each of the second and the third solenoid valves $16_2$, $16_3$ is constituted by a three-way valve which is switchable between an oil supply position in which No. 19 and No. 20 oil passages L19, L20 on the output side of the respective solenoid valves are connected to No. 24 oil passage L24, and an oil discharge position in which this connection is shut off and connect each of the oil passages L19, L20 to each of oil discharge ports $16_2a$, $16_3a$, respectively. At the time of non-energization thereof, it is switched to the oil supply position and change the hydraulic pressure in each of No. 19 and No. 20 oil passages L19, L20 to a high hydraulic pressure (modulator pressure).

It may also be considered to constitute the second and the third solenoid valves $16_2$, $16_3$ by a two-way valve like the first solenoid valve $16_1$. However, the two-way valve has disadvantages in that an oil leak amount when opened becomes large and that the control response becomes poor because, at a low temperature, there remains a residual hydraulic pressure even when it is opened. Here, at the time of low speed running at the first speed or at the time when the vehicle is stopped, the revolution speed of the engine lowers so that the amount of oil supply from the hydraulic pressure source 10 decreases and, therefore, the oil leak amount must be minimized. In addition, at the first speed, since the second shift valve $12_2$ and the changeover valve 13 are moved to the right position, No. 19 and No. 20 oil passages L19, L20 must be made to the atmospheric pressure. If the second and the third solenoid valves $16_2$, $16_3$ are constituted by two-way valves, the leak amount becomes excessive. In view of the above disadvantages and in view of the fact that the switching operation of the changeover valve 13 that must be switched with a good response is carried out by the third solenoid valve $16_3$, the following arrangement has been employed in this embodiment. Namely, the second and the third solenoid vales $16_2$, $16_3$ are respectively constituted by a three-way valve and, in view of the space, only the first solenoid valve $16_1$ is constituted by a small-sized two-way valve.

In the "$D_4$" position of the manual valve 11, the state of energization or non-energization of the first through the third solenoid valves $16_1$, $16_2$, $16_3$; the position of the first and the second shift valves $12_1$, $12_2$; and the output pressures (pressures in No. 22 and No. 23 oil passages L22, L23 ) of the first and the second pressure regulating valves $14_1$, $14_2$; at the in-gear time (initial gear engagement), as well as at the first through the fourth speeds are as shown in the table given hereinbelow.

| | 1st speed | 1st ⇆ 2nd speed | 2nd speed | 2nd ⇆ 3rd speed | 3rd speed | 3rd ⇆ 4th speed | 4th speed |
|---|---|---|---|---|---|---|---|
| 1st sol. valve ($16_1$) | x | o | o | o | o | x | x |
| 2nd sol. valve ($16_2$) | o | o | o | x | x | x | x |
| 3rd sol. valve ($16_3$) | o | o | x | x | o | o | x |
| 1st shift valve ($12_1$) | Left | Right | Right | Right | Right | Left | Left |
| 2nd shift valve ($12_2$) | Right | Right | Right | Left | Left | Left | Left |
| changeover valve (13) | Right | Right | Left | Left | Right | Right | Left |
| 1st p. reg. valve ($14_1$) | H | H ⇆ L | L | L ⇆ H | H | H ⇆ L | L |
| 2nd p. reg. valve ($14_2$) | L | L ⇆ H | H | H ⇆ L | L | L ⇆ H | H | sol. valve = solenoid valve; p. reg. valve = pressure regulating valve; L = Low; H = High; o = energized; x = not energized In this embodiment, between the first and the second pressure regulating valves $14_1$, $14_2$, the one that functioned as an oil supply pressure regulating valve for boosting the hydraulic pressure in the hydraulic clutch on the engaging side at the time of the last speed changing will function as an oil discharge pressure regulating valve (i.e., a pressure regulating valve for oil discharge) for dropping or lowering the hydraulic pressure in the hydraulic clutch on the disengaging side at the time of the next speed changing. Further, the one that functioned as an oil discharge pressure regulating valve at the time of the last speed changing will function as an oil supply pressure regulating valve (i.e., a pressure regulating valve for oil supply) at the time of the next speed changing. Therefore, the output pressure of each of the pressure regulating valves $14_1$, $14_2$ can be maintained as it is to thereby make it ready for the next speed changing. On the contrary, if one of the first and the second pressure regulating valves $14_1$, $14_2$ is used exclusively for oil supply and the other thereof is used exclusively for oil discharge, the following becomes necessary. Namely, the output pressure of the oil supply pressure regulating valve that was boosted at the time of speed changing must be lowered, and also the output pressure of the oil discharge pressure regulating valve that was lowered at the time of speed changing must be boosted to be prepared for the next speed changing. In this case, if the next speed changing is made at a low temperature within a short period of time, the speed changing will start when the pressure dropping of the output pressure in the oil supply pressure regulating valve or the boosting of the output pressure in the oil discharge pressure regulating valve has not been made sufficiently. As a consequence, the hydraulic pressure control at the time of speed changing gets out of order and the speed change shocks are likely to occur. Therefore, it is preferable to use, as in this embodiment, the first and the second pressure regulating valves $14_1$, $14_2$ alternately for oil supplying and for oil discharging at each speed changing.

Figure 4:
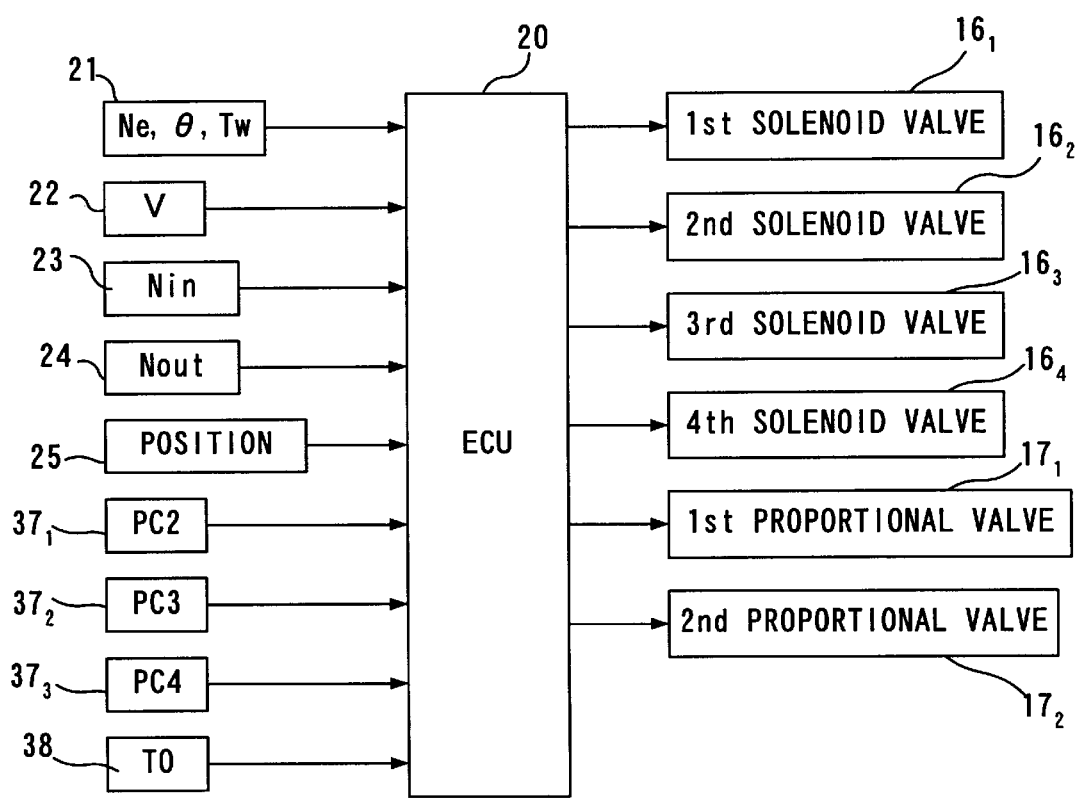
FIG. 4 is a block circuit diagram of a control system for solenoid valves provided in the hydraulic oil circuit.

The first through the third solenoid valves $16_1$, $16_2$, $16_3$ as well as the first and the second solenoid proportional valves $17_1$, $17_2$ are controlled, together with a fourth solenoid valve $16_4$ for a lockup clutch which is described later, by an electronic control unit 20 which is made up of a microcomputer as shown in FIG. 4.

In the electronic control unit (ECU) 20, there are inputted: a signal from a throttle sensor 21 for detecting a throttle opening e of the engine; a signal from a vehicle speed sensor 22 for detecting the vehicle speed V; a signal from a speed sensor 23 for detecting the rotational speed Nin of the input shaft 3 of the transmission; a signal from a speed sensor 24 for detecting the rotational speed Nout of the output shaft 7 of the transmission; a signal from a position sensor 25 for the selector lever; signals from hydraulic pressure sensors $37_1$, $37_2$, $37_3$ which serve as hydraulic pressure detecting means for detecting the hydraulic pressures PC2, PC3, PC4 of the second through the fourth speed hydraulic clutches C2, C3, C4; and a signal from an oil sensor 38 which serves as oil temperature detecting means for detecting the oil temperature TO in the transmission.

In the "$D_4$" position, a transmission train that suits the present throttle opening e and the vehicle speed V is selected based on a speed change map for the first through the fourth speeds kept in memory in the ECU 20, thereby carrying out an automatic speed changing of the first through the fourth speeds.

Also in the "$D_3$" position, the same oil circuit arrangement applies as that in the "$D_4$" position. Automatic speed changing of the first through the third speeds is performed based on the speed change map for the first through the third speeds that is stored in the ECU 20.

In the "2" and "1" positions, a stepwise downshifting to the second speed or to the first speed is carried out based on the second speed map or the first speed map that is stored in the ECU 20. Thereafter, the speed is maintained in the second speed or the first speed. In the "2" and "1" positions, No. 21 oil passage L21 that was connected to No. 1 oil passage L1 is opened to atmosphere. The third shift valve $12_3$ can thus become switchable to the right position.

When the third shift valve $12_3$ is switched to the right position, No. 10 oil passage L10 that was connected, in the left position, to the oil discharge port $12_3b$ is connected to No. 12 oil passage L12. And No. 11 oil passage L11 that was connected, in the left position, to No. 12 oil passage L12 is connected to the oil discharge port $12_3c$ of the third shift valve $12_3$. No. 10 oil passage L10 and No. 11 oil passage L11 are connected, in the right position of the first shift valve $12_1$, to none of the oil passages for the hydraulic clutches. When the first shift valve $12_1$ is moved to the right position, the oil circuit arrangement will become the same as that when the first shift valve $12_1$ is moved to the right position in the "$D_4$" position. Therefore, when both the first and the second shift valves $12_1$, $12_2$ are switched to the right position (a condition of the second speed in the "$D_4$" position), the hydraulic oil is supplied to the second speed hydraulic clutch C2 to thereby establish the second speed transmission train G2. When the first shift valve $12_1$ is moved to the right position and the second shift valve $12_2$ is moved to the left position (a condition of the third speed in the "$D_3$ position), the hydraulic oil is supplied to the third speed hydraulic clutch C3 to thereby establish the third speed transmission train G3.

On the other hand, when the first shift valve $12_1$ is switched to the left position, No. 14 oil passage L14 for the second speed hydraulic clutch C2 is connected to No. 10 oil passage L10, and No. 17 oil passage L17 for the fourth speed hydraulic clutch C4 is connected to No. 11 oil passage L11, respectively, the oil circuit arrangement will therefore become different from that in the "$D_4$" position. When the first shift valve $12_1$ is moved to the left position and the second shift valve $12_2$ is moved to the right position (a condition of the first speed in the "$D_4$" position), No. 13 oil passage L13 for the first speed hydraulic clutch C1 is connected to No. 4 oil passage L4 (this connection is the same as that in the "$D_4$" position), and No. 14 oil passage L14 for the second speed hydraulic clutch C2 is connected to No. 6 oil passage L6 (in the "$D_4$" position No. 17 oil passage L17 for the fourth speed hydraulic clutch C4 is connected to No. 6 oil passage L6 ). When both the first and the second shift valves $12_1$, $12_2$ are moved to the left position (a condition of the fourth speed in the "$D_4$" position), No. 15 oil passage L15 for the third speed hydraulic clutch C3 is connected to No. 3 oil passage L3 (this connection is the same as that in the "$D_4$" position). No. 14 oil passage L14 for the second speed hydraulic clutch C2 is connected to No. 5 oil passage L5 (in the "$D_4$" position No. 17 oil passage L17 for the fourth speed hydraulic clutch C4 is connected to No. 5 oil passage L5 ). No oil supply is therefore made to the fourth speed hydraulic clutch C4.

Here, the third shift valve $12_3$ is arranged to be urged to the left by that output pressure of the second solenoid proportional valve $17_2$ which is inputted via No. 26 oil passage L26. However, when the electric power supply to the first through the third solenoid valves $16_1$, $16_2$, $16_3$ as well as to the first and the second solenoid proportional valves $17_1$, $17_2$ stops at the time of a system failure due to opening of a fuse or the like, both the first and the second shift valves $12_1$, $12_2$ and the changeover valve 13 are switched to the left position, and also the output pressure of the second solenoid proportional valve $17_2$ becomes the atmospheric pressure. The third shift valve $12_3$ is thus switched in the "2" and the "1" positions to the right position and switched, in the "$D_4$" and the "$D_3$" positions, to the left position by the line pressure from No. 21 oil passage L21. Therefore, in the "1" and the "2" positions, the second speed transmission train G2 is established and, in the "$D_4$" and the "$D_3$" positions, the fourth speed transmission train G4 is established, respectively. The vehicle is able to run at the second speed and the fourth speed even at the time of the system failure.

In the "R" position of the manual valve 11, No. 2 oil passage L2 is opened to the atmosphere. No. 27 oil passage L27 is connected to No. 1 oil passage L1 and the hydraulic oil is supplied to a first oil chamber 15a on the left end of the servo valve 15 via No. 28 oil passage L28 which is connected to No. 27 oil passage L27 via a first servo control valve 27. According to these operations, the servo valve 15 is urged to the rightward reverse running position to thereby switch the selector gear 8 to the reverse running side. Also No. 28 oil passage L28 is connected to No. 29 oil passage L29 via that shaft bore 15b of the servo valve 15 which is communicated with the first oil chamber 15a. The oil passage L29 is connected to No. 16 oil passage L16 which is communicated with the fourth speed hydraulic clutch C4 in the "R" position of the manual valve 11. In this manner, the reverse transmission train GR is established by the hydraulic oil supply to the fourth speed hydraulic clutch C4 and by the switching of the selector gear 8 to the reverse running side.

The first servo control valve 27 is urged, by the hydraulic pressure in No. 20 oil passage L20 on the output side of the third solenoid valve $16_3$ and the hydraulic pressure in No. 25 oil passage L25 on the output side of the first solenoid proportional valve $17_1$, to the leftward open side in which No. 27 oil passage L27 and No. 28 oil passage L28 are connected. It is urged by a spring 27a, the hydraulic pressure in No. 2 oil passage L2 and the hydraulic pressure in No. 29 oil passage L29, to the rightward closed side in which the connection between No. 27 oil passage L27 and No. 28 oil passage L28 is shut off and connect No. 28 oil passage L28 to an oil discharge port 27b. In the "$D_4$", "$D_3$", "2" or "1" position, by means of the line pressure to be inputted via No. 2 oil passage L2, the first servo control valve 27 is held in the right position even if the output pressures of the third solenoid valve $16_3$ and the first solenoid proportional valve $17_1$ may both be increased. The oil supply to No. 28 oil passage L28 is thus blocked, and the servo valve 15 is retained in the leftward forward running position by an engaging member 15c, whereby the establishment of the reverse transmission train GR is blocked.

Further, when the manual valve 11 is switched to the "R" position while the vehicle is running forwards at a speed above a predetermined speed, the output pressures of both the third solenoid valve $16_3$ and the first solenoid proportional valve $17_1$ are made to be atmospheric pressure. The fist servo control valve 27 is thus held in the right position, whereby the hydraulic oil supply to No. 28 oil passage L28, i.e., the establishment of the reverse transmission train GR, is blocked.

When the manual valve 11 is switched to the "R" position below a predetermined vehicle speed, the output pressure of the first solenoid proportional valve $17_1$ is gradually increased to thereby urge the first servo control valve 27 to the leftward open side. As described above, the hydraulic oil is supplied to the fourth speed hydraulic clutch C4 via No. 28 oil passage L28, the servo valve 15 and No. 29 oil passage L29. The first servo control valve 27 is functioned as a pressure regulating valve to thereby control the boosting of the hydraulic pressure in the fourth speed hydraulic clutch C4. Thereafter, the modulator pressure is outputted from the third solenoid valve $16_3$ to thereby urge the first servo control valve 27 to the last endmost position, whereby the hydraulic pressure in the fourth speed hydraulic clutch C4 is maintained at the line pressure. Even if the third solenoid valve $16_3$ fails while it is kept switched on and consequently its output pressure remains in the atmospheric pressure, the hydraulic pressure required to engage the fourth speed hydraulic clutch C4 can be secured by the output pressure of the first solenoid proportional valve $17_1$.

When the manual valve 11 is switched from the "R" position to the "$D_4$", "$D_3$", "2", or "1" position, the line pressure is inputted from No. 30 oil passage L30 which is connected like No. 2 oil passage L2 to No. 1 oil passage L1 in each of the above positions, to a second oil chamber 15$d$ which is present in an intermediate position of the servo valve 15 via the second servo control valve 28 and No. 31 oil passage L31. The servo valve 15 is thus moved to the left and is switched to the forward running position.

The second servo control valve 28 is urged, by the first speed pressure to be inputted via No. 13 oil passage L13, the output pressure of the second solenoid valve $16_2$ to be inputted via No. 19 oil passage L19, and the output pressure of the second pressure regulating valve $14_2$ to be inputted via No. 23 oil passage L23, to the left position in which No. 30 oil passage L30 and No. 31 oil passage L31 are connected. It is urged by a spring 28$a$ and the hydraulic pressure in No. 27 oil passage L27 to the right position in which the connection between No. 30 and No. 31 oil passages L30, L31 is shut off and No. 31 oil passage L31 is connected to an oil discharge port 28$b$.

In this manner, in the "R" position, the second servo control valve 28 is surely switched to the right position by the line pressure from No. 27 oil passage L27. After switching the manual valve 11 to the "$D_4$", "$D_3$", "2" or "1" position, the second servo control valve 28 is maintained in the right position until the first speed pressure rises to a predetermined value. The inputting of the line pressure to the second oil chamber 15$d$ is thus blocked and the servo valve 15 is retained by an engaging means 15$c$ in the reverse running position. When the first speed pressure has become a predetermined value or above, the second servo control valve 28 is switched to the left position, and the line pressure is inputted to the second oil chamber 15$d$ to thereby switch the servo valve 15 to the forward running position. Therefore, even if the manual valve 11 is switched from the "R" position to the "$D_4$", "$D_3$", "2" or "1" position in a condition in which an accelerator pedal is stepped, the rotation in the reverse direction of the output shaft 7 is being restrained, at the time of switching of the servo valve 15, by a torque transmission in the forward (or positive) direction of rotation via the first speed transmission train G1 due to a rise in the first speed pressure. Consequently, the selector gear 8 and a driven gear G4$a$ of the fourth speed transmission train G4 can smoothly be engaged in a condition in which no large relative rotation occurs. Wear of the meshing (or engaging) portions of both the gears 8, G4$a$ can thus be prevented.

In case of an occurrence of an abnormality in that the second servo control valve 28 is locked in the right position due to an inclusion of a foreign matter or the like, or else the servo valve 15 is locked in the reverse running position even after the servo control valve 28 has been switched to the left position, the selector gear 8 will remain in the reverse running position even if the manual valve 11 is switched from the "R" position to the "$D_4$", "$D_3$", "2" or "1" position. If the hydraulic oil is consequently supplied to the fourth speed hydraulic clutch C4, the reverse transmission train GR will thus be established. As a solution, in this embodiment, there are provided No. 32 oil passage L32 which is in communication with the left end oil chamber of the third shift valve $12_3$, and No. 33 oil passage L33 which is connected, in the reverse running position of the servo valve 15, to the second oil chamber 15$d$ of the servo valve 15 via a notched groove 15$e$. It is thus so arranged that No. 32 oil passage L32 can be connected to No. 30 oil passage L30 in the right position of the second servo valve 28 and to No. 33 oil passage L33 in the left position of the second servo valve 28, respectively. According to this arrangement, when the above-described abnormality should occur, the line pressure is inputted to the left end oil chamber of the third shift valve $12_3$ via No. 32 oil passage L32. Therefore, the third shift valve $12_3$ is switched and held in the right position regardless of the hydraulic pressures in No. 21 oil passage L21 and No. 26 oil passage L26 which both urge the third shift valve $12_3$ leftwards, whereby the hydraulic oil supply to the fourth speed hydraulic clutch C4 is blocked.

Once switched to the left position, the second servo valve 28 is held in the left position by a self-locking force to be generated by a difference in the pressure-receiving area between right and left lands of an annular groove 28$c$ which connects No. 30 oil passage L30 and No. 31 oil passage L31 together. In case, however, the oil level largely varies due to a sudden cornering whereby the hydraulic pressure from the hydraulic pressure source 10 instantly stops or disappears, the second servo control valve 28 may be switched to right position by the force of the spring 28$a$. In such a case, if the second servo control valve 28 is arranged to be urged leftwards only by the first speed pressure, the second servo control valve 28 will no longer be returned, at the second through the fourth speeds, to the left position even when the hydraulic pressure restores. As a solution, in this embodiment, the second servo control valve 28 is urged to the left position also by the output pressure of the second pressure regulating valve $14_2$ that becomes high at the second and the fourth speeds, as well as by the output pressure of the second solenoid valve $16_2$ that becomes high at the third and the fourth speeds. At the first through the third speeds, even if the second servo control valve 28 does not return to the left position and the third shift valve $12_3$ is switched to the right position by the input of the line pressure from No. 32 oil passage L32, the oil supply to, and discharge from, each of the hydraulic clutches C1 through C4 are not affected. However, at the fourth speed, the hydraulic oil is supplied to the second speed hydraulic clutch C2 and, consequently, the speed is downshifted from the fourth speed to the second speed. Therefore, at the fourth speed, the second servo control valve 28 is urged leftwards by the output pressure of the second pressure regulating valve $14_2$ and the output pressure of the second solenoid valve $16_2$. Thus, even if one of the output pressures does not rise to a normal value after the restoration of the hydraulic pressure, the second servo control valve 28 is arranged to be surely switched to the left position.

In the "N" position of the manual valve 11, No. 2 oil passage L2, No. 16 oil passage L16, No. 17 oil passage L17, No. 27 oil passage L27, No. 29 oil passage L29, and No. 30 oil passage L30 are all opened to atmosphere, and all of the hydraulic clutches C1 through C4 are disengaged. Further, in the "P" position, No. 27 oil passage L27 is connected to No. 1 oil passage L1, and the servo valve 15 is switched to the reverse running position by the inputting of the line pressure via the first servo control valve 27 and No. 28 oil passage L28. In the "P" position, however, the connection between No. 16 oil passage L16 and No. 29 oil passage L29 is shut off to thereby open No. 16 oil passage L16 to atmosphere. There is therefore no possibility that the reverse transmission train GR is established.

The fluid torque converter 2 contains therein a lock-up clutch 2$a$. In the hydraulic oil circuit there is provided a lock-up control portion 29 for controlling the operation of the lock-up clutch 2$a$ with the hydraulic oil to be supplied from the regulator 18 via No. 34 oil passage L34 operating as the working oil.

The lock-up control portion 29 is made up of: a shift valve 30 which controls to switch on and off the lock-up clutch 2$a$;

a changeover valve 31 which switches the engaged condition of the lock-up clutch 2a at the time of being switched on between a locked up condition in which no slipping occurs and a slipping condition; and a pressure regulating valve 32 which controls to increase or decrease the engaging force in the slipping condition.

The shift valve 30 is switchable between the following two positions, i.e.: a right position in which No. 34 oil passage L34 is connected to No. 35 oil passage L35 which is communicated with a backpressure chamber of the lock-up clutch 2 a and in which No. 36 oil passage L36 which is communicated with an internal space of the fluid torque converter 2 is connected, via a throttled portion 30a, to No. 37 oil passage L37 for oil discharge; and a left position in which No. 34 oil passage L34 is connected to No. 38 oil passage L38 which is communicated with the changeover valve 31 and also to No. 36 oil passage L36 via the throttled portion 30a, and in which No. 35 oil passage L35 is connected to No. 39 oil passage L39 which is communicated with the pressure regulating valve 32. The shift valve 30 is controlled by the fourth solenoid valve $16_4$. The fourth solenoid valve $16_4$ is constituted by a two-way valve which opens to atmosphere No. 40 oil passage L40 which is connected to No. 24 oil passage L24 on the output side of the modulator valve 19 via a throttle $16_4a$. The shift valve 30 is urged to the left position by the hydraulic pressure in No. 24 oil passage L24, i.e., by the modulator pressure, and is urged to the right position by a spring 30b and the hydraulic pressure in No. 40 oil passage L40. When the fourth solenoid valve $16_4$ is closed and the hydraulic pressure in No. 40 oil passage L40 is boosted to the modulator pressure, the shift valve 30 is switched to the right position. When the fourth solenoid valve $16_4$ is opened and the hydraulic pressure in No. 40 oil passage L40 is lowered to the atmospheric pressure, the shift valve 30 is switched to the left position.

The changeover valve 31 is switchable between the following two positions, i.e., a right position in which No. 41 oil passage L41 which is communicated with the internal space of the fluid torque converter 2 is connected to No. 42 oil passage L42 which is communicated with a left end oil chamber of the pressure regulator valve 32, and a left position in which No. 42 oil passage L42 is opened to atmosphere and in which No. 38 oil passage L38 is connected to No. 36 oil passage L36. The changeover valve 31 is urged to the right position by a spring 31a and is urged to the left position by the hydraulic pressure in No. 43 oil passage L43 which is connected to the right-end oil chamber.

The pressure regulating valve 32 is switchable between the following two positions, i.e., a right position in which No. 39 oil passage L39 is connected to No. 34 oil passage L34 and in which No. 41 oil passage L41 is connected to No. 37 oil passage L37 via a throttle 32a, and a left position in which the connection between No. 39 oil passage L39 and No. 34 oil passage L34 is shut off and connect No. 39 oil passage L39 to a throttled oil discharge port 32b, and in which the connection between No. 41 oil passage L41 and No. 37 oil passage L37 is shut off. The pressure regulating valve 32 is urged rightwards by a spring 32c and the hydraulic pressure in No. 42 oil passage L42, and is urged leftwards by the hydraulic pressure in No. 39 oil passage L39 and the hydraulic pressure in No. 43 oil passage L43. Here, let the pressure receiving area to receive the hydraulic pressure in No. 39 oil passage L39 and the pressure receiving area to receive the hydraulic pressure in No. 42 oil passage L42 be both s1, the pressure receiving area to receive the hydraulic pressure in No. 43 oil passage L43 be s2, the hydraulic pressures in No. 39 oil passage L39, No. 42 oil passage L42 and No. 43 oil passage L43 be Pa, Pb and Pc, respectively, and the urging force of the spring 32c be F. Then, we have $$s1 \cdot Pb + F = s1 \cdot Pa + s2 \cdot Pc$$

$$Pb - Pa = (s2 \cdot Pc - F)/s1$$

The differential pressure between the hydraulic pressure in No. 42 oil passage L42 and the hydraulic pressure in No. 39 oil passage L39 is increased or decreased depending on the hydraulic pressure in No. 43 oil passage L43.

No. 43 oil passage L43 is connected, in the right position of the changeover valve 13, to No. 25 oil passage L25 on the output side of the first solenoid proportional valve $17_1$ and, in the left position of the changeover valve 13, to No. 26 oil passage L26 on the output side of the second solenoid proportional valve $17_2$. In this manner, the changeover valve 31 and the pressure regulating valve 32 are controlled by the first solenoid proportional valve $17_1$ at the time of the first and the third speeds in which the changeover valve 13 is in the right position, and by the second solenoid proportional valve $17_2$ at the time of the second and the fourth speeds in which the changeover valve 13 is in the left position.

When the shift valve 30 is in the right position, the working oil from No. 34 oil passage L34 is supplied to the back pressure chamber of the lock-up clutch 2a via the shift valve 30 and No. 35 oil passage L35. Also, the internal space of the fluid toque converter 2 is connected to No. 37 oil passage L37 via No. 41 oil passage L41 and the pressure regulating valve 32 as well as via No. 36 oil passage L36 and the throttled portion 30a of the shift valve 30. Due to the oil discharge from the internal space via No. 37 oil passage L37, the internal pressure in the internal space is lowered, whereby the lock-up clutch 2a becomes a condition of being switched off, i.e., in a condition in which the engagement is released.

When the shift valve 30 is switched to the left position, the back pressure chamber of the lock-up clutch 2a is connected to No. 39 oil passage L39 via No. 35 oil passage L35 and the shift valve 30. While the changeover valve 31 is in the right position, the internal space of the fluid torque converter 2 is connected to No. 34 oil passage L34 via No. 36 oil passage L36 and the throttled portion 30a of the shift valve 30, as well as to No. 42 oil passage L42 via No. 41 oil passage L41 and the changeover valve 31. The differential pressure between the internal pressure in the internal space and the internal pressure in the back pressure chamber can be controlled for increase or decrease by that hydraulic pressure in No. 43 oil passage L43 which is inputted to the pressure regulating valve 32. In this manner, the lock-up clutch 2a is engaged, in a slipping condition, with an engaging force corresponding to the output pressure of the first solenoid proportional valve $17_1$ or the second solenoid proportional valve $17_2$.

When the hydraulic pressure in No. 43 oil passage L43 has become a predetermined value and above whereby the changeover valve 31 is switched to the left position, No. 42 oil passage L42 is opened to atmosphere and consequently the pressure regulating valve 32 is switched to, and retained in, the left position. The back pressure chamber of the lock-up clutch 2a thus remains connected to the oil discharge port 32b of the pressure regulating valve 32 via No. 35 oil passage L35, the shift valve 30, and No. 39 oil passage L39. On the other hand, the hydraulic oil is supplied from No. 34 oil passage L34 to the internal space of the fluid torque converter 2 via the shift valve 30, No. 38 oil passage L38, the changeover valve 31, and No. 36 oil passage L36. Further, since the connection between No. 41 oil passage L41 and No. 37 oil passage L37 is shut off by the switching of the pressure regulating valve 32 to the left position, the internal pressure inside the internal space is maintained at a relatively high pressure that is set by a check valve 33 which is connected to No. 41 oil passage L41. The lock-up clutch 2a is thus engaged in the locked up condition.

In the figure, numeral 34 denotes an oil cooler interposed in No. 37 oil passage L37, numeral 35 denotes a check valve for the oil cooler, numeral 36 denotes a throttle member which is interposed in a lubricating oil passage LB which supplies leaked oil from the regulator 18 to lubricated portions in each of the shafts 3, 5, 7 of the transmission.

Explanation will now be made about the control of the first and the second solenoid proportional valves $17_1$, $17_2$ at the time of speed changing, particularly at the time of upshifting. In the following explanations, the following definitions are used. Namely, the output pressure of the solenoid proportional valve which controls the hydraulic pressure of the hydraulic clutch on the engaging side to be engaged at the time of upshifting is defined to be an ON pressure. The output pressure of the solenoid proportional valve which controls the hydraulic pressure of the hydraulic clutch on the disengaging side to be disengaged or released at the time of speed changing is defined to be an OFF pressure.

Figure 6:
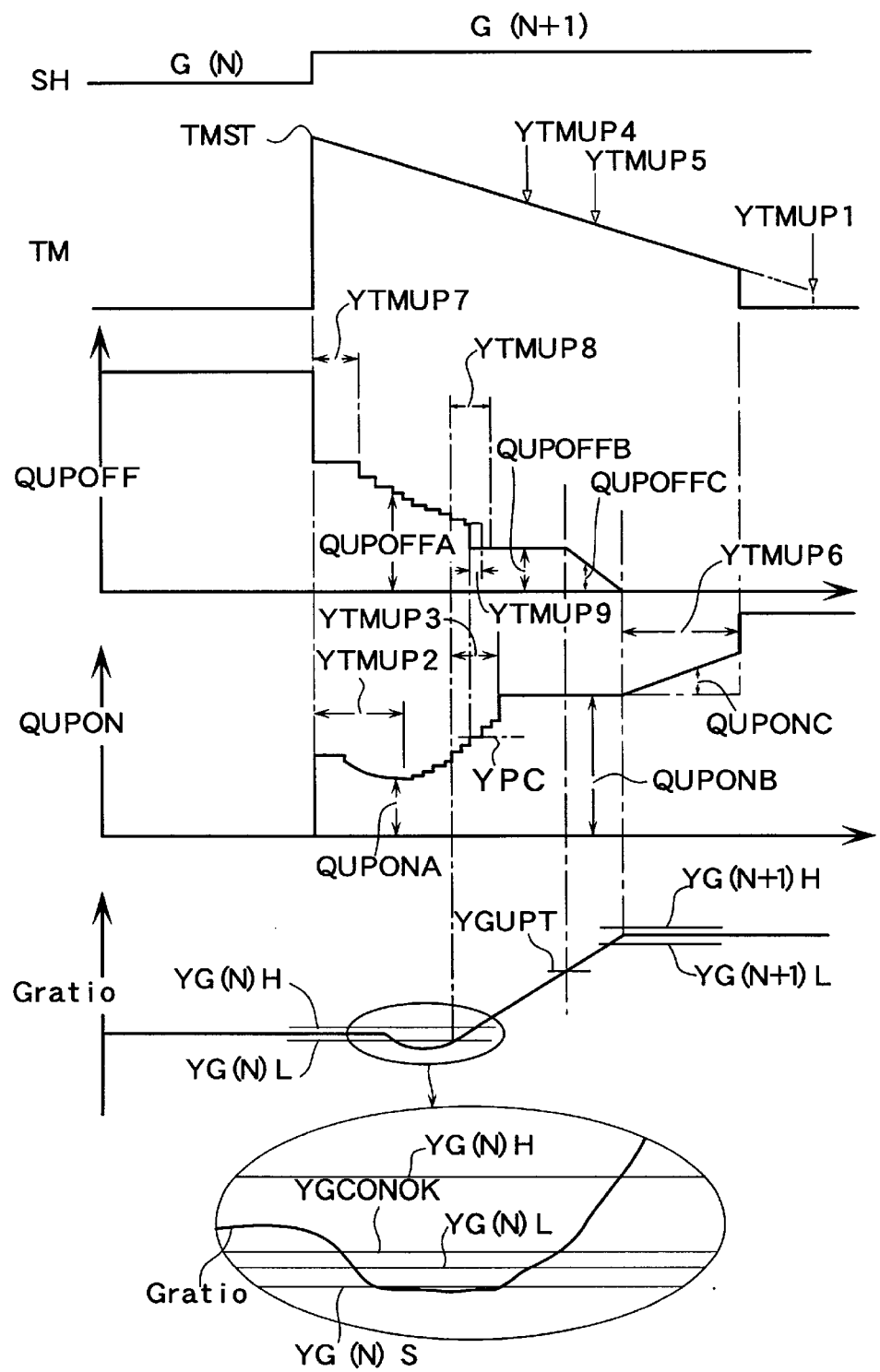
FIG. 6 is a time chart to show the changes in ON pressure, OFF pressure, and "Gratio" at the time of upshifting.
Figure 7:
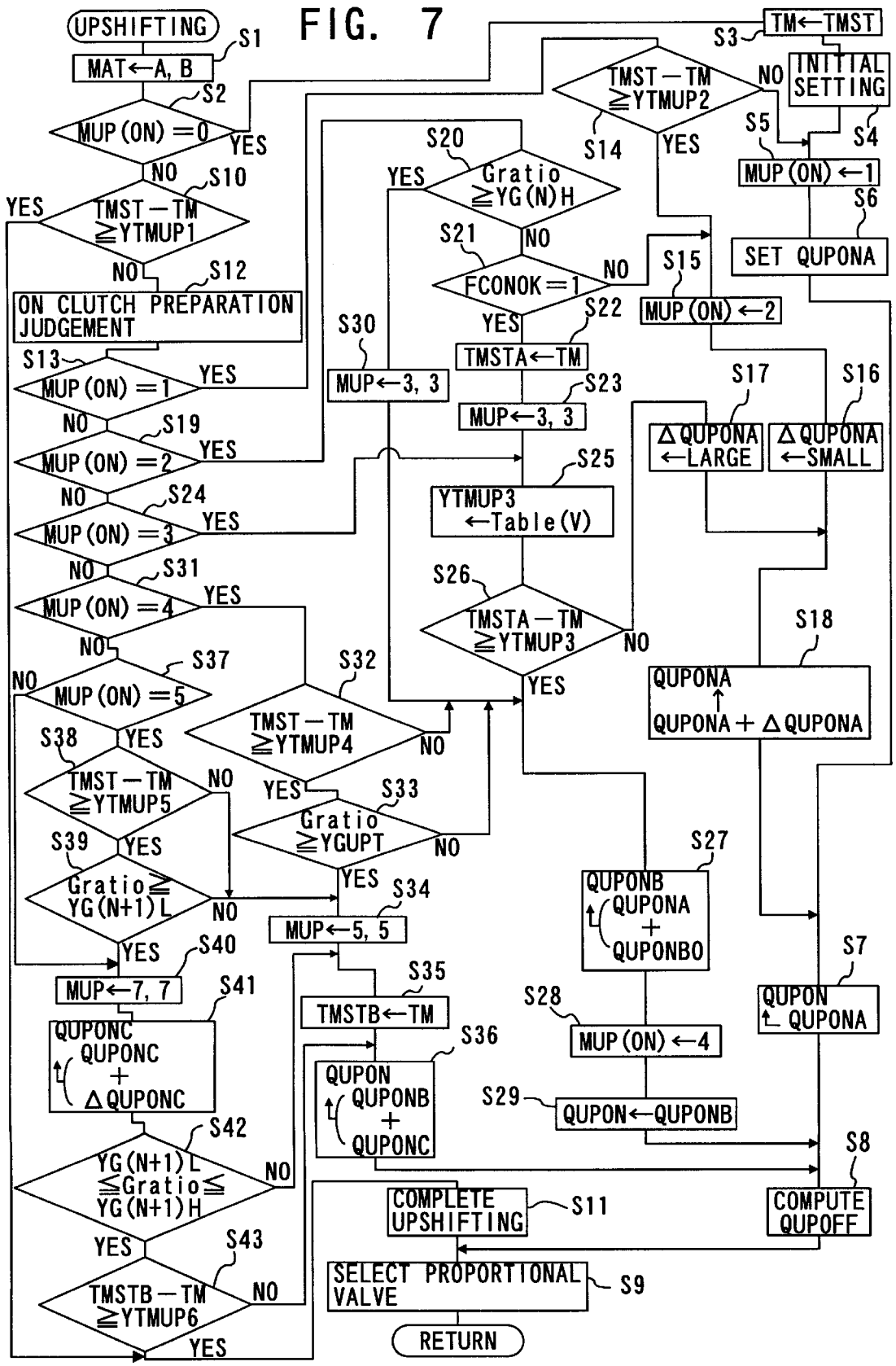
FIG. 7 is a flow chart to show the control at the time of upshifting.

The upshifting control is performed in the procedures shown in FIG. 7 by using proportional valve monitor values MAT which represent, as shown in FIG. 5A, the relationship in magnitude (high or low) of the output pressures of the first solenoid proportional valve $17_1$ and the second solenoid proportional valve $17_2$, and upshifting monitor values MUP which represent, as shown in FIG. 5B, the control modes of the ON pressure and the control modes of the OFF pressure at the time of upshifting. Details of this upshifting control will now be explained with reference to FIG. 6 which schematically shows the changes in the ON pressure, the OFF pressure, and the input and output speed ratio "Gratio" (Nout/Nin) of the transmission, respectively, at the time of upshifting. The "Gratio" may vary or fluctuate slightly depending on the pulsations in the speed detecting pulses, noises, or the like. However, when a hydraulic clutch has completely been engaged, "Gratio" will fall within a range between a predetermined upper limit value YG(N)H and a lower limit value YG(N)L which are based on a gear ratio of each speed stage.

The upshifting control is started when a speed stage designation signal SH which designates a speed stage to be established is switched to a signal which designates a higher speed stage G(N+1) than the speed stage G(N) that is now being established. In the upshifting control, MAT is first set to "A, B" in step S1. Once MAT has thus been set, the first and the second shift valves $12_1$, $12_2$ are switched to a condition in which the upshifting can be made. Then, in step 2, a discrimination is made whether the value (MUP(ON)) on the side of ON of MUP is "0" or not. MUP is initially set to "0,0" and, after making a judgement of "YES" in step S2, the program (or process) proceeds to step S3. In step S3, the remaining time TM of a subtractive timer (subtraction type of timer) built in the electronic control circuit 20 is set to a predetermined initial value TMST. Also, in step S4, initial setting is made of various kinds of values to be used in the operation (or computation) of the ON pressure and the OFF pressure. Then, in step S5, a setting of MUP(ON)=1 is made. Further, in step S6, a standard (or reference) value QUPONA of the ON pressure in a response pressure mode is computed (S6). The response pressure mode is a control mode in which a play of a piston in a hydraulic clutch on the engaging side is removed to thereby perform a subsequent clutch pressure increase with a good response. The value QUPONA is set to an appropriate value according to the vehicle speed and the throttle opening, and decreases with the lapse of time.

Then, the program proceeds to step S7, in which the processing is performed of setting QUPON which is a command value of the ON pressure to QUPONA. Then, the program proceeds to step S8, in which a processing is performed of computing a command value QUPOFF of the OFF pressure, which is described in detail hereinafter. Then, the program proceeds to step S9, in which the following processing of selecting the proportional valves is performed. Namely, a command value of the output pressure of that solenoid proportional valve, between the first and the second solenoid proportional valves $17_1$, $17_2$, which controls the hydraulic pressure of the hydraulic clutch on the engaging side in the speed changing at this time is made to be QUPON, and a command value of the output pressure of the solenoid proportional valve which controls the hydraulic pressure of the hydraulic clutch on the disengaging side is made to be QUPOFF. The first upshifting control processing is thus completed.

In the next upshifting control processing, since the setting of MUP(ON)=1 has already been made in step S5 last time, a judgement of "NO" is made in step S2. At this time, the program proceeds to step S10 and a discrimination is made whether or not the time of lapse from the start of the upshifting (TMST−TM) has reached a predetermined time YTMUP1. The time YTMUP1 is set longer than an ordinary time required for upshifting. When TMST−TM≧YTMUP1, a judgement is made that an upshifting control has failed, and the program proceeds to step S11. In step S13, a processing to complete the upshifting in which MAT is set to "A,0" (at the time of upshifting from the second speed to the third speed), or to "0, B" (at the time of upshifting other than from the second speed to the third speed), and MUP is set to "0,0", and also TM is reset to zero is performed. When MAT is set to "A,0" or "0,B" in this processing, the changeover valve 13 is switched to a position which is different from the present position, whereby the hydraulic pressure in the hydraulic clutch on the engaging side becomes the line pressure and the hydraulic pressure of the hydraulic clutch on the disengaging side becomes atmospheric pressure.

Figure 8:
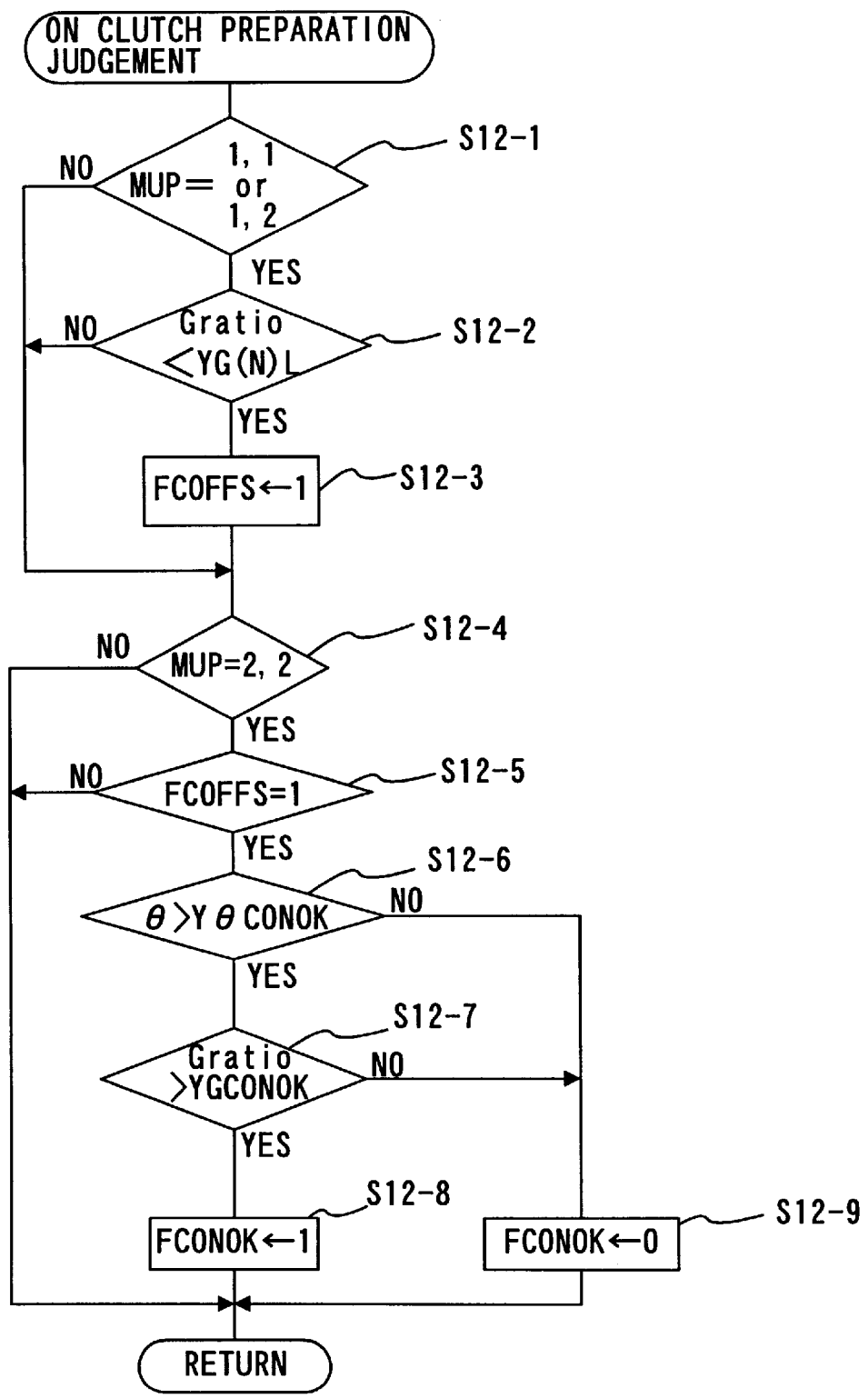
FIG. 8 is a flow chart to show the contents of control in step S12 in FIG. 7.

If TMST−TM<YTMUP1, the program proceeds to step S12 to judge whether the preparation for engagement of the hydraulic clutch on the engaging side (ON clutch) has been made or not. Details of this processing are shown in FIG. 8. First, a discrimination is made in step S12-1 whether or not MUP is "1,1" or "1,2". If the result of the discrimination is "YES", the program proceeds to step S12-2. In step S12-2, a discrimination is made whether "Gratio" has fallen below that lower limit value YG(N)L for judging the clutch engagement which is set based on the gear ratio of the speed stage established before speed changing. If "Gratio"<YG(N)L, the program proceeds to step S12-3, in which a flag FCOFFS to be reset to "0" in the above-described step S4 is set to "1". Then, in step S12-4, a discrimination is made whether MUP is "2,2" or not. If the result of this discrimination is "YES", the program proceeds to step S12-5 to discriminate whether FCOFFS=1 or not. If FCOFFS=1, a discrimination is made in step S12-6 whether the throttle opening θ exceeds a predetermined value YθCONOK or not. If θ>YθCONOK, the program proceeds to step S12-7, in which a discrimination is made whether "Gratio" exceeds a predetermined value YGCONOK which is set a little larger than YG(N)L. If "Gratio">YGCONOK, the program proceeds to step S12-8, in which a flag FCONOK to be reset to "0" in step S4 is set to "1". In case θ≦YθCONOK or "Gratio"≦YGCONOK, the program proceeds to step S12-9, in which FCONOK is reset to "1".

It is when slipping has occurred in the hydraulic clutch on the disengaging side by the control of the OFF pressure in a subtraction mode, which is described hereinafter, that the condition of "Gratio"<YG(N)L is satisfied when MUP is "1,1" or "1,2". Further, it is when the hydraulic clutch on the engaging side has begun to secure an engaging force, i.e., when the preparation for engaging the hydraulic clutch on the engaging side has been completed by the control of the ON pressure in an addition mode, which is described hereinafter, that the condition of "Gratio">YGCONOK is satisfied when MUP is "2,2". If the condition of "Gratio"<YG(N)L is not satisfied when MUP is "1,1" or "1,2", then FCOFFS is not set to "1". In this case, even if the condition of "Gratio">YGCONOK has been satisfied when MUP is "2,2", FCONOK remains to be zero (FCONOK=0).

The degree of change in the engine output torque with the degree of throttle opening becomes large in a small throttle opening region. When the throttle opening becomes small, the output torque largely decreases. As a consequence, the slipping of the hydraulic clutch on the disengaging side decreases to thereby sometimes satisfy the condition of "Gratio">YGCONOK. Therefore, in the small throttle opening region in which θ≦YθCONOK, FCONOK is made to be zero (FCONOK=0), and the setting of FCONOK based on "Gratio" is made only in the medium/large throttle opening region in which the output torque does not largely vary. The setting of FCONOK=1 is thus prevented when the preparation for engagement of the hydraulic clutch on the engaging side has not been made yet.

After having made the processing of judging whether the preparation for engagement of the hydraulic clutch on the engaging side has been made or not as described above, a discrimination is made in step S13 whether MUP(ON)=1 or not. Since in the second upshifting control processing, MUP(ON) has already been set to 1 (MUP(ON)=1), a judgement of "YES" is made in step S13. The program proceeds to step S14, in which a discrimination is made whether the time of lapse from the start of upshifting (TMST-TM) has reached a predetermined time YTMUP2 or not. If TMST-TM<YTMUP2, the program proceeds to S5 and following steps (i.e., steps that follow). When TMST-TM≧YTMUP2, the program proceeds to step S15, in which the value of MUP on the ON side is set to "2". Then, ΔQUPONA is set to a relatively small value in step S16 and the program proceeds to step S18, in which an adding processing is performed to make QUPONA to a value which is obtained by adding ΔQUPONA to the preceding value of QUPONA. The program then proceeds to step S7 and following steps. In this manner, a control in the addition mode to increase stepwise the ON pressure is started.

When a setting of MUP(ON)=2 is made in step S15, a determination of "NO" is made in step S13 in the next upshifting control processing. The program thus proceeds to step S19, in which a discrimination is made whether MUP (ON)=2 or not. Here, a discrimination of "YES" is made and the program proceeds to step S20, in which a discrimination is made whether "Gratio" has exceeded that upper limit value YG(N)H for judging the engagement of the hydraulic clutch which is set based on the gear ratio of the speed stage established before speed changing. Then, if "Gratio"<YG (N)H, the program proceeds to step S21 to discriminate whether FCONOK=1 or not. If FCONOK=0, the program proceeds to step S15 and following steps to continue the control in the addition mode.

If FCONOK=1, the value of TM at that time is stored in step S22 as TMSTA. Then, after setting MUP to "3,3" in step S23, the program proceeds to step S25 and following steps. In the next upshifting control processing, a determination of "NO" is made in step S19. The program thus proceeds to step S24, in which a discrimination is made whether MUP (ON)=3 or not, and a discrimination of "YES" is made therein. At this time, YTMUP3 is set in step S25, and the program then proceeds to step S26, in which a discrimination is made whether the time of lapse from the time when CONOK=1 has been attained, i.e., from the time when the preparation for engagement of the hydraulic clutch on the engaging side has been completed (TMSTA-TM) has reached YTMUP3 or not. The value YTMUP3 is set to a table value which has the vehicle speed V as a parameter, such that YTMUP3 becomes longer with the increase in the vehicle speed. While TMSTA-TM<YTMUP3, ΔQUPONA is set to a relatively large value in step S17, and the program proceeds to step S18 and following steps. The control in the addition mode is thus continued.

When TMSTA-TM≧YTMUP3, the program proceeds to step S27, in which a reference value QUPONB of the ON pressure in a bottom up mode is set to a value which is obtained by adding to the final value of QUPONA a value QUPONBO to be obtained depending on the vehicle speed and the throttle opening. Then, the program proceeds to step S28, in which a setting of MUP(ON)=4 is made. Thereafter, in step S29, QUPON is set to QUPONB, thereby starting the control of the ON pressure in the bottom up mode. When a discrimination of "Gratio">YG(N)H is made in step S20, MUP is set to "3,3" in step S30 and the program proceeds directly to step S27.

In the next upshifting control processing, since the setting of MUP(ON)=4 has already been made in step S28 last time, a judgement of "NO" is made in step S24. The program thus proceeds to step S31 for discriminating whether MUP (ON)=4 or not, and a judgement of "YES" is made therein. At this time, the program proceeds to step S32, in which a discrimination is made whether the time of lapse from the start of upshifting (TMST-TM) has reached a predetermined time YTMUP4. While TMST-TM<YTMUP4, the program proceeds to step S27 and following steps and the control in the bottom up mode is continued. When TMST-TM≧YTMUP4, a discrimination is made in step S33 whether "Gratio" has exceeded a predetermined value YGUPT or not. While "Gratio"<YGUPT, the program proceeds to step S27 and following steps to continue the control in the bottom up mode.

When "Gratio"≧YGUPT, the program proceeds to step S34 to set MUP to "5,5" and then proceeds to step S35, in which the value of TM at that time is stored as TMSTB. Then, the program proceeds to step S36, in which QUPON is set to a value which is obtained by adding QUPONC to the final value of QUPONB. Since the value of QUPONC has already been reset to zero in step S4, QUPON becomes equal to QUPONB (QUPON=QUPONB), and the control in the bottom up mode is continued.

In the next upshifting control processing, since MUP has already been set to "5,5" in step S34 last time, a judgement of "NO" is made in step S31, and the program proceeds to step S37 for discriminating whether MUP(ON)=5 or not, and a judgement of "YES" is made therein. At this time, a discrimination is made in step S38 whether the time of lapse from the start of upshifting (TMST−TM) has reached a predetermined time YTMUP5. If TMST−TM≧YTMUP5, the program proceeds to step S39, in which a discrimination is made whether "Gratio" is above that lower limit value YG(N+1)L for judging the clutch engagement which is set based on the gear ratio of the speed stage established after speed changing. If TMST−TM<YTMUP5 or "Gratio"<YG (N+1), the program proceeds to step S34 and following steps, and the control in the bottom up mode is continued.

When "Gratio"≧YG(N+1)L, MUP is set to "7,7" in step S40 and the program then proceeds to step S41, in which QUPONC is set to a value which is obtained by adding a predetermined value ΔQUPONC to the previous value of QUPONC. Then, in step S42, a discrimination is made whether "Gratio" lies within a range between those lower limit value YG(N+1)L and upper limit value YG(N+1)H for judging the clutch engagement which are set based on the gear ratio of the speed stage established after speed changing. If the result of this discrimination is "NO", the program proceeds to step S35 and following steps. In this case, since QUPONC increases by ΔQUPONC in the operation (or computation) in step S41, QUPON to be obtained in step S36 also gradually increases, and the control of the ON pressure in an end mode is started.

In the next upshifting control processing, since MUP has already been set to "7,7" in step S40 last time, a judgement of "NO" is made in step S37, and the program proceeds to step S40 and following steps. In this case, if YG(N+1) L≦"Gratio"≦YG(N+1)H, i.e., if the clutch on the engaging side has completed engagement, the program proceeds to step S45. In step S43, a discrimination is made whether the time of duration of engagement completion (TMSTB−TM) has reached a predetermined time YTMUP6. While TMSTB−TM<YTMUP6, the program proceeds to step S36 and the control in the end mode is continued. When TMSTB−TM≧YTMUP6, the program proceeds to step S11, in which a processing of upshifting completion is performed.

Figure 9:
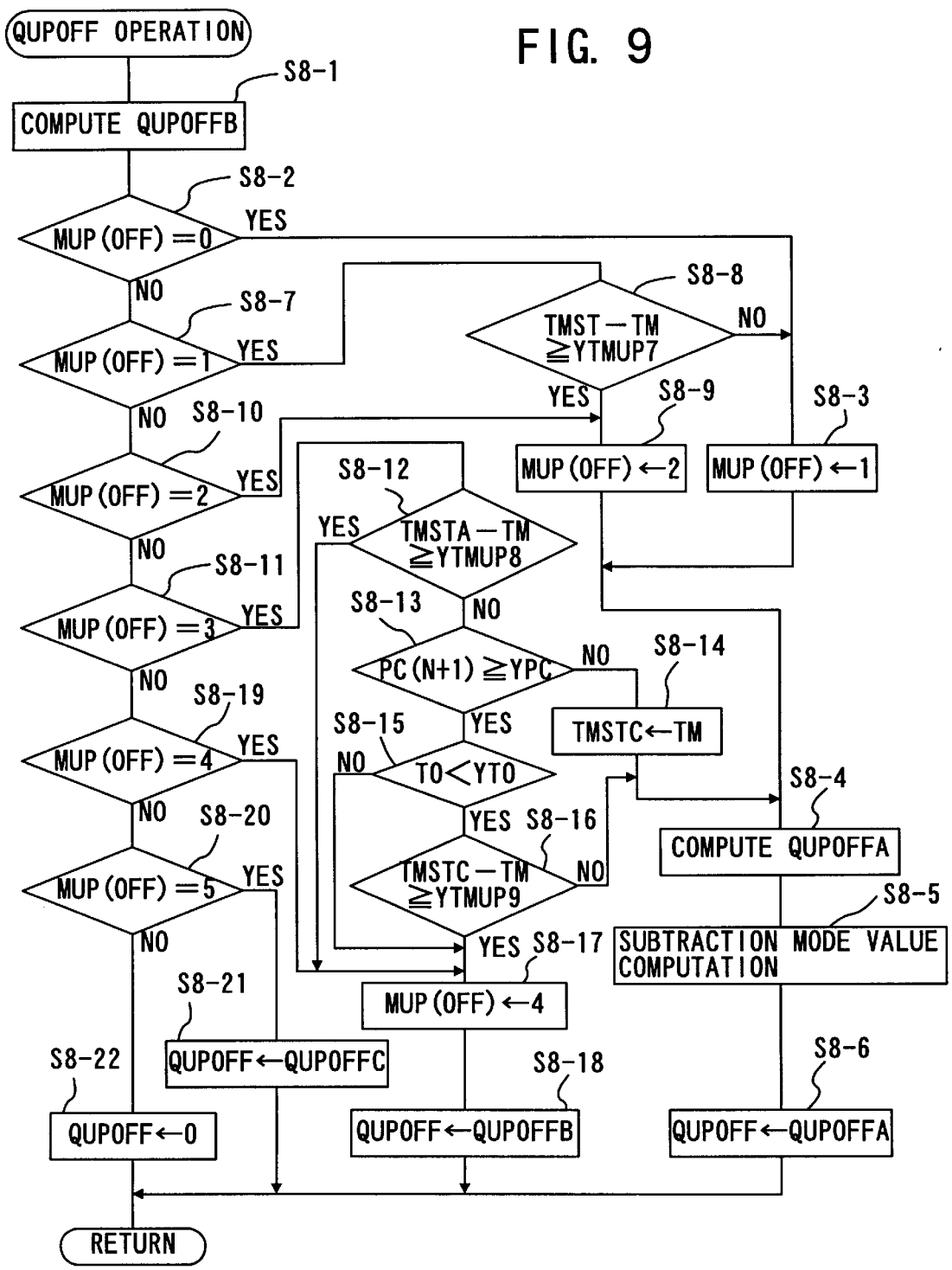
FIG. 9 is a flow chart to show the contents of control in step S8 in FIG. 7.
Figure 10:
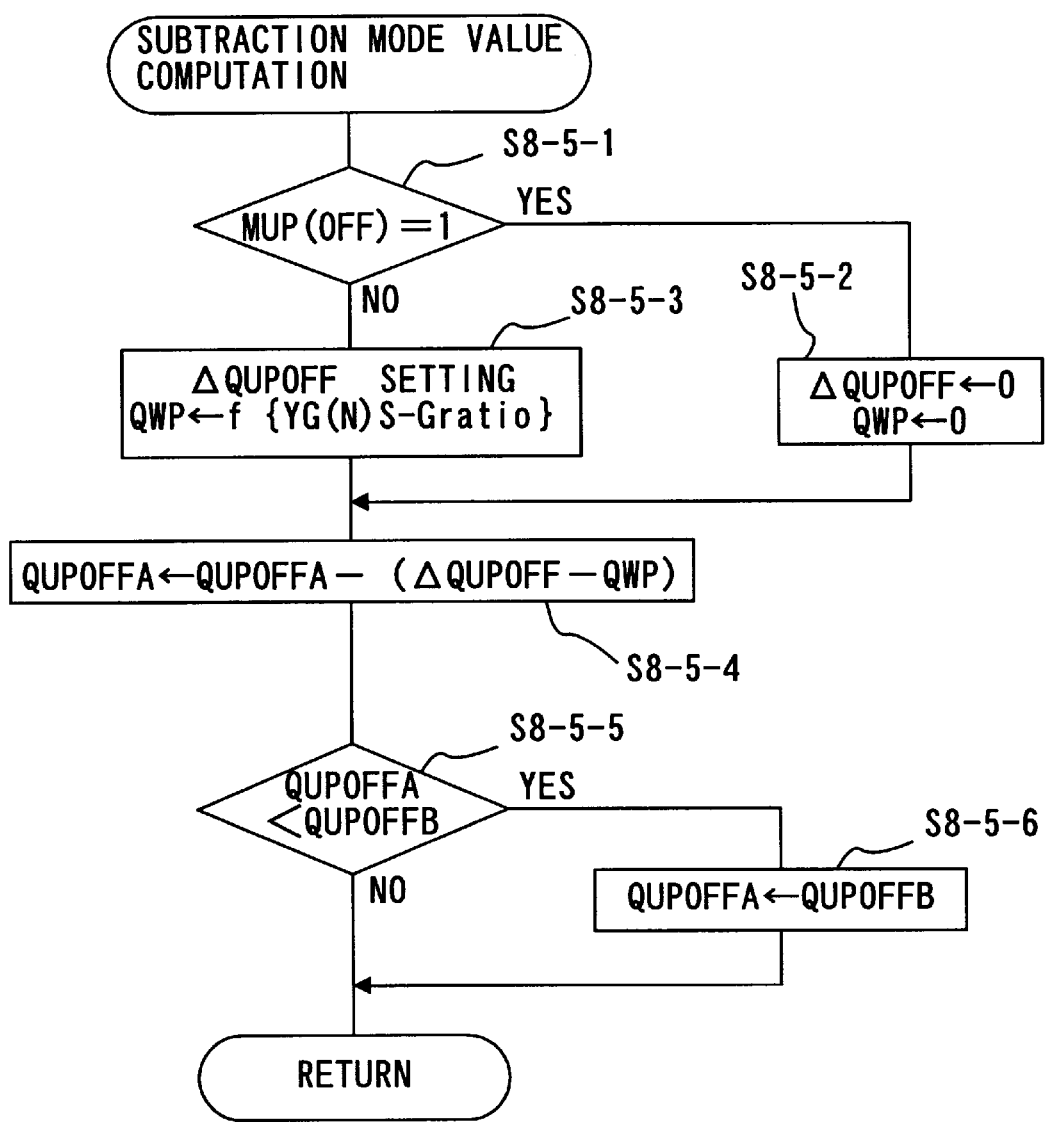
FIG. 10 is a flow chart to show the contents of control in step S8-5 in FIG. 9.

Details of operational processing of QUPOFF in step S8 are shown in FIG. 9. First, in step S8-1, the value QUPOFFB of the OFF pressure in a bottom down mode is set to an appropriate value depending on the throttle opening. Then, in step S8-2, a discrimination is made whether the value of MUP on the OFF side (MUP(OFF)) is "0" or not. Since MUP(OFF) has already been set to zero (MUP(OFF)=0) in the upshifting control processing in the first time, a judgement of "YES" is made in step S8-2. The program thus proceeds to step S8-3, in which a setting of MUP(OFF)=1 is made. Then, the program proceeds to step S8-4, in which a standard (reference) value QUPOFFA of the OFF pressure in an initial pressure mode is set to an appropriate value depending on the throttle opening and the speed ratio of the fluid torque converter 2. Further, in step S8-5, a processing of operating (computing) a value of the OFF pressure in the subtraction mode is performed. Details of this processing are shown in FIG. 10. First, in step S8-5-1, a discrimination is made whether MUP(OFF)=1 or not. If MUP(OFF)=1, both a subtraction value ΔQUPOFF and a feedback correction value QWP are reset to zero in step S8-5-2. If MUP(OFF)≠1, ΔQUPOFF is set to a predetermined value in step S8-5-3 and, also, QWP is computed by a functional operation from a deviation between "Gratio" at the present time and that target value of clutch slipping YG(N)S which is set a little lower than the lower limit value YG(N)L for judging the clutch engagement, the lower limit value being set based on the gear ratio of the speed stage established before speed changing. Then, in step S8-5-4, there is performed a processing to make QUPOFFA to a value which is obtained by subtracting ΔQUPOFF−QWP from the value of QUPOFFA that is set in step S8-4. Finally, by the processing in steps S8-5-5 and S8-5-6, QUPOFFA is made so as not fall below QUPOFFB.

After the processing in step S8-5 has been completed as described above, in step S8-6, a processing is made of making QUPOFF to QUPOFFA. An operational processing of QUPOFF in the first time of upshifting control processing is thus completed. In the second time of upshifting control processing, since the setting of MUP(OFF)=1 has already been made in step S8-3 last time, a judgement of "NO" is made in step S8-2. The program thus proceeds to step S8-7 for making a discrimination as to whether MUP(OFF)=1 or not, and a judgement of "YES" is made therein. At this time, the program proceeds to step S8-8, in which a discrimination is made whether the time of lapse from the start of upshifting (TMST−TM) has reached a predetermined time YTMUP7. If TMST−TM<YTMUP7, the program proceeds to step S8-3 and following steps. In this case, QUPOFF becomes equal to the value of QUPOFFA which is obtained in step S8-4, and the control in the initial pressure mode is performed.

When TMST−TM≧YTMUP7, a setting of MUP(OFF)=2 is made in step S8-9 and then the program proceeds to step S8-4 and following steps. In this case, QUPOFF becomes a value which is obtained by subtracting ΔQUPOFF−QWP from QUPOFFA which is obtained in the map in step S8-4, and a control in the subtraction mode is started. In the next processing of upshifting control, since the setting of MUP (OFF)=2 has already been made in step S8-9 last time, a judgement of "NO" is made in step S8-7. The program thus proceeds to step S8-10 for making a discrimination as to whether MUP(OFF)=2 or not. A judgement of "YES" is made therein and the program proceeds to step S8-9 and following steps, and the control in the subtraction mode is continued. In the subtraction mode, QUPOFF sequentially decreases, and the hydraulic clutch on the disengaging side begins to slide, with the result that "Gratio" falls below YG(N)L. When "Gratio"<YG(N)S, a condition of QWP>0 is attained and the subtraction range of QUPOFFA becomes smaller. A feedback control is thus made so as to attain a condition of "Gratio"=YG(N)S.

When MUP is set to "3,3" in the above-described step S23 or S30, a discrimination of "NO" is made in step S8-10. The program thus proceeds to step S8-11 for making a discrimination as to whether MUP(OFF)=3 or not, and a judgement of "YES" is made therein. At this time, the program proceeds to step S8-12, in which a judgement is made as to whether the time of lapse from the time of completion of preparation for engagement of the hydraulic clutch on engaging side (TMSTA−TM) has reached a predetermined time YTMUP8. The value YTMUP8 is set longer than an ordinary time it takes for the actual hydraulic pressure of the hydraulic clutch on the engaging side to increase to a pressure which does not cause slipping to the hydraulic clutch on the engaging side. Therefore, normally, a judgement of "NO" is made in step S8-12 and proceeds to step S8-13, in which a discrimination is made as to whether, among the hydraulic pressures detected by the hydraulic pressure sensors $37_1$–$37_3$, the hydraulic pressure of the hydraulic clutch to be engaged by the upshifting of this time PC(N+1) has exceeded a predetermined value YPC. If PC(N+1)<YPC, the value of TM at that time is stored as TMSTC in step S8-14. Thereafter, the program proceeds to the step S8-4 and following steps and the control in the subtraction mode is continued.

Once PC(N+1)≧YPC, a discrimination is made in step S8-15 as to whether the oil temperature TO detected by the oil temperature sensor 38 is below a predetermined value YTO (e.g., −10° C.) or not. If TO<YTO, the program proceeds to step S8-16, in which the time of lapse from the time when the condition PC(N+1)≧YPC has been satisfied (TMSTC−TM) has reached a predetermined time YTMUP9 or not. When TMSTC−TM≧YTMUP9 has been satisfied, setting of MUP(OFF)=4 is made in step S8-17. Then, the program proceeds to step S8-18, in which QUPOFF is set to QUPOFFB to thereby start the control in the bottom down mode. If TO≧YTO, the program directly proceeds from step S8-15 to step S8-17. Also when a condition TMSTA−TM≧YTMUP8 has been satisfied while PC(N+1)<YPC, the program proceeds directly from step S8-12 to step S8-17 to thereby start the control in the bottom down mode.

In the next processing of upshifting control, since the setting of MUP(OFF)=4 has already been made last time in step S8-17, a judgement of "NO" is made in step S8-11. The program thus proceeds to step S8-19 for making a discrimination as to whether MUP(OFF)=4 or not. A judgement of "YES" is made therein and the program proceeds to step S8-17 and following steps, and a control in the bottom down mode is continued.

When MUP is set to "5,5" in the above-described step S34, a judgement of "NO" is made in step S8-19. The program thus proceeds to step S8-20 for making a discrimination as to whether MUP(OFF)=5 or not, and a judgement of "YES" is made therein. At this time, the program proceeds to step S8-21, and QUPOFF is set to a value QUPOFFC which gradually decreases from QUPOFFB depending on "Gratio". A control in a tail mode is thus performed. Then, when MUP has been set to "7,7" in the above-described step S40, a judgement of "NO" is made in step S8-20. The program thus proceeds to step S8-22, and a control is performed in the end mode in which QUPOFF is made to zero.

In the above-described upshifting control, by the control of the OFF pressure in the subtraction mode, the OFF pressure is reduction-controlled so that "Gratio" is reduced and held to YG(N)S which is slightly lower than YG(N)L. A slight slipping thus occurs in the hydraulic clutch on the disengaging side. Since the ON pressure is gradually increased by the control of the ON pressure in the addition mode in this condition, "Gratio" sensitively varies with the engaging force of the hydraulic clutch on the engaging side. Therefore, the point of time of completion of preparation for engagement of the hydraulic clutch on the engaging side can be detected as the time when "Gratio" once lowers below the engaging region between YG(N)L and YG(N)H and again rises to the engaging region. Conventionally, the following arrangement is also known. Namely, in order to prevent the engine from racing, the ON pressure is gradually increased while controlling the OFF pressure such that the hydraulic clutch on the disengaging side does not slip, i.e., such that the "Gratio" lies within a range between YG(N)L and YG(N(H). When "Gratio" has exceeded YG(N)H as a result of decrease in the rotational speed of the input shaft due to simultaneous engagement of the hydraulic clutch on the disengaging side and the hydraulic clutch on the engaging side, a judgement is made that the speed change condition has transferred to an inertia phase. The OFF pressure is then rapidly decreased and, further, the ON pressure is rapidly increased. However, if the rate of gradual increase in the ON pressure is made large, the engaging force of the hydraulic clutch on the engaging side at the time of transferring to the inertia phase becomes excessive, resulting in the occurrence of shocks. Therefore, the rate of gradual increase in the ON pressure cannot be made so large and, consequently, it takes much time for the speed change condition to transfer to the inertia phase. This results in a longer time required in the speed changing. On the other hand, in the present embodiment, the completion of preparation for engagement of the hydraulic clutch on the engaging side is detected as described above. Thereafter, when the hydraulic pressure of the hydraulic clutch on the engaging side PC(N+1) to be detected by the oil temperature sensor has exceeded the predetermined value YPC, the OFF pressure is reduced to a predetermined low pressure by the switching to the bottom down mode. Therefore, the speed change condition can be transferred at an early time to the inertia phase (a condition of "Gratio">YG(N)H)) while preventing the engine from racing, thereby enabling to reduce the time required for speed changing. Further, in the present embodiment, since the rate of gradual increase in the ON pressure in the addition mode is increased from the point of time of completion of preparation for engagement, the transferring to the inertia phase can still further be accelerated.

If the oil temperature TO is low, the viscosity of the oil increases. As a result, the pressure drop due to the flow resistances in the oil passages between the oil pressure sensors $37_1$–$37_3$ and the hydraulic clutches C2–C4 becomes large. Therefore, at the time of low oil temperature when the condition TO<YTO is satisfied, the actual hydraulic pressure in the hydraulic clutch on the engaging side is still low at the time when PC(N+1) has risen to YPC. If the control in the bottom down mode is started at this point of time, engine racing will occur. In the present embodiment, however, at the time of low oil temperature, the control in the bottom down mode is started by delaying, by the predetermined time YTMUP9, from the point of time when PC(N+1) has risen to YPC. Therefore, during this delay time, the actual hydraulic pressure of the hydraulic clutch on the engaging side rises, and engine racing does not occur. YTMUP9 may be made to be variable depending on the oil temperature such that the lower the oil temperature is, the longer the time becomes.

Figure 11:
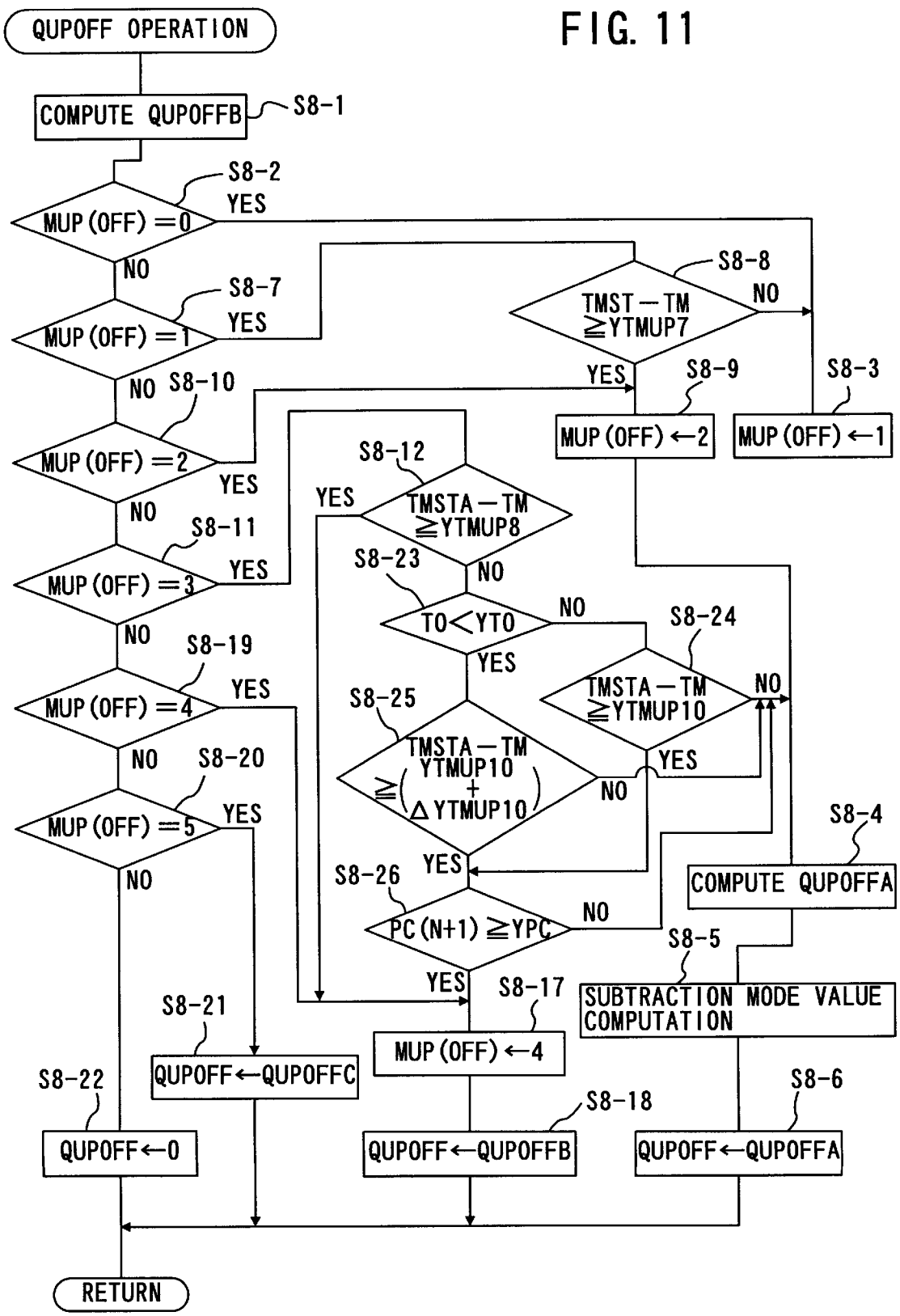
FIG. 11 is a flow chart to show the contents of control in step S8 in FIG. 7 in another embodiment.

FIG. 11 shows another embodiment of the computation processing of QUPOFF. The difference between this embodiment and the one shown in FIG. 9 is that the following steps are provided in place of the steps S8-13 through S8-16 in FIG. 9. Namely, if a judgement of TMSTA−TM<YTMUP8 is made in step S8-12, a discrimination is made in step S8-23 as to whether the oil temperature TO has become lower than the predetermined value YTO. If TO≧YTO, a discrimination is made in step S8-24 as to whether the time of lapse from the point of time of completion of preparation for engagement (TMSTA−TM) has reached a predetermined time YTMUP10 or not. YTMUP10 is set slightly shorter than an ordinary time which is required for PC(N+1) to rise from the time of completion of preparation for engagement to YPC. A discrimination is thereafter made in step S8-26 as to whether PC(N+1)≧YPC or not with the point of time when TMSTA−TM≧YTMUP10 is satisfied serving as the time for starting the discrimination. When a condition of PC(N+1) ≧YPC has been satisfied, the program proceeds to step S8-17 and following steps to start the control of the OFF pressure in the bottom down mode. Right after the time of completion of preparation for engagement, the ON pressure is not stable yet and there is a possibility that PC(N+1) ≧YPC is satisfied temporarily due to the pulsating changes in the ON pressure. However, since the pulsating changes in the ON pressure will become stable by the above-described time for starting the discrimination. Therefore, the wrong discrimination can be prevented by thereafter making the discrimination as to whether or not PC(N+1)≧YPC.

If TO<YTO, the program proceeds to step S8-25, in which a discrimination is made as to whether the time of lapse from the point of time of completion of preparation for engagement (TMSTA–TM) has reached the time obtained by adding a predetermined time ΔYTMUP10 to the above-described YTMUP10. After the condition of TMSTA–TM≧YTMUP10+ΔYTMUP10 has been satisfied, the program proceeds to step S8-26. In this manner, at the time of low oil temperature, the time of discriminating whether the condition of PC(N+1)≧YPC has been satisfied or not is delayed by the time ΔYTMUP10. The time ΔYTMUP10 is set to such a value that it has already satisfied the condition of PC(N+1)≧YPC at the time when the condition of TMSTA–TM≧YTMUP10+ΔYTMUP10 is satisfied. Therefore, when the program proceeds from step S8-25 to step S8-26 at the time of low oil temperature, the condition of PC(N+1)≧YPC normally has already been satisfied. At the time when the program proceeds to step S8-26, the actual hydraulic pressure in the hydraulic clutch on the engaging side has already risen, with the result that engine racing will not occur. ΔYTMUP10 may be made variable depending on the oil temperature such that the lower the oil temperature is, the longer it becomes.

In the above-described embodiment, hydraulic pressure sensors $37_1$, $37_2$, $37_3$ are used as the hydraulic oil pressure detecting means. However, oil pressure switches which are switched on when the hydraulic oil pressure has risen to a predetermined value may also be used. In such an arrangement, a discrimination is made in step S8-13 in FIG. 9 or in step S8-26 in FIG. 11 as to whether the hydraulic pressure switches have been switched on.

As can be seen from the above-described explanations, according to the present invention, even if the rise in the actual hydraulic oil pressure in the hydraulic engaging element on the engaging side is delayed at the time of low oil temperature, the decrease in the releasing pressure is delayed. During that time, the actual hydraulic oil pressure in the hydraulic engaging element on the engaging side rises. Therefore, a smooth speed changing without engine racing can be obtained.

It is readily apparent that the above-described control apparatus for a hydraulically operated vehicular transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a hydraulically operated vehicular transmission having a plurality of speed stages to be established by a selective operation of a plurality of hydraulic engaging elements, wherein a hydraulic pressure of a hydraulic engaging element on engaging side to be engaged at the time of speed changing is defined to be an engaging pressure and a hydraulic pressure of a hydraulic engaging element on disengaging side to be disengaged at the time of speed changing is defined to be a disengaging pressure, said apparatus comprising:

hydraulic pressure detecting means for detecting said engaging pressure;

discriminating means for discriminating whether a detected value of said engaging pressure has exceeded a predetermined value or not; and pressure reducing means for reducing said disengaging pressure to a predetermined low pressure when said detected value is discriminated to have exceeded said predetermined value;

characterized in that said apparatus further comprises:

oil temperature detecting means for detecting an oil temperature in said transmission; and delay means for delaying the operation of said pressure reducing means at a time of low oil temperature when a detected value of said oil temperature is below said predetermined value.

2. A control apparatus according to claim 1, wherein said delay means is constituted such that, at the time of said low oil temperature, said pressure reducing means is operated by delaying by a predetermined time from the point of time when said engaging pressure has exceeded said predetermined value.

3. A control apparatus according to claim 1, wherein said discriminating means is constituted to start said discrimination from a predetermined discrimination starting time after starting of speed changing, and wherein said delay means is constituted to delay said discrimination starting time by a predetermined time at the time of said low oil temperature.

\* \* \* \* \*